United States Patent
Miyajima

(10) Patent No.: US 10,298,876 B2
(45) Date of Patent: May 21, 2019

(54) INFORMATION PROCESSING SYSTEM, CONTROL METHOD, AND STORAGE MEDIUM

(71) Applicant: SONY CORPORATION, Tokyo (JP)

(72) Inventor: Yasushi Miyajima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 10 days.

(21) Appl. No.: 15/521,688

(22) PCT Filed: Aug. 5, 2015

(86) PCT No.: PCT/JP2015/072218
§ 371 (c)(1),
(2) Date: Apr. 25, 2017

(87) PCT Pub. No.: WO2016/072120
PCT Pub. Date: May 12, 2016

(65) Prior Publication Data
US 2017/0244928 A1      Aug. 24, 2017

(30) Foreign Application Priority Data
Nov. 7, 2014   (JP) .................................. 2014-227007

(51) Int. Cl.
*H04N 5/92*      (2006.01)
*H04N 5/765*    (2006.01)
(Continued)

(52) U.S. Cl.
CPC ....... *H04N 5/9201* (2013.01); *G06K 9/00684* (2013.01); *G06K 9/00718* (2013.01);
(Continued)

(58) Field of Classification Search
CPC .... H04N 5/9201; H04N 5/765; H04N 9/8205; H04N 9/87; G06K 9/00684; G06K 9/00718
See application file for complete search history.

(56) References Cited

U.S. PATENT DOCUMENTS 8,989,792 B1 * 3/2015 Depew ................ H04B 1/3838
455/117
2009/0123086 A1   5/2009 Iwanami
(Continued)

FOREIGN PATENT DOCUMENTS

| JP | 2000-214755 A | 8/2000 |
|---|---|---|
| JP | 2002-035437 A | 2/2002 |

(Continued)

OTHER PUBLICATIONS

Office Action for JP Patent Application No. 2016-557472, dated Feb. 12, 2019, 05 pages of Office Action and 03 pages of English Translation.

*Primary Examiner* — Mishawn N Hunter
(74) *Attorney, Agent, or Firm* — Chip Law Group

(57) ABSTRACT

An information processing system, a control method and a non-transitory storage medium through which reproduction that matches characteristics of devices of a playback side can be performed by generating abstracted presence reproduction information are provided. The information processing system includes: a generation unit that generates abstracted presence reproduction information depending on features extracted from content data; and a storage controller that controls the presence reproduction information generated by the generation unit to be stored in association with the content data.

14 Claims, 19 Drawing Sheets

TARGET MOVING IMAGE

(51) Int. Cl.
*H04N 21/235* (2011.01)
*H04N 21/435* (2011.01)
*G06K 9/00* (2006.01)
*G06T 7/20* (2017.01)
*G11B 27/34* (2006.01)
*H04N 9/87* (2006.01)
*H04N 21/233* (2011.01)
*H04N 21/234* (2011.01)
*H04N 21/84* (2011.01)
*H04N 21/854* (2011.01)
*H04N 9/82* (2006.01)
*H04N 21/422* (2011.01)
*A63J 25/00* (2009.01)

(52) U.S. Cl.
CPC ............... *G06T 7/20* (2013.01); *G11B 27/34* (2013.01); *H04N 5/765* (2013.01); *H04N 9/8205* (2013.01); *H04N 9/87* (2013.01); *H04N 21/233* (2013.01); *H04N 21/235* (2013.01); *H04N 21/2353* (2013.01); *H04N 21/23418* (2013.01); *H04N 21/42202* (2013.01); *H04N 21/435* (2013.01); *H04N 21/84* (2013.01); *H04N 21/854* (2013.01); *A63J 25/00* (2013.01)

(56) References Cited

U.S. PATENT DOCUMENTS

| | | | | |
|---|---|---|---|---|
| 2010/0121920 | A1* | 5/2010 | Horner | G06F 17/30265 709/204 |
| 2011/0105857 | A1* | 5/2011 | Zhang | G11B 27/034 600/300 |
| 2014/0002354 | A1* | 1/2014 | Nishigaki | H04N 9/8233 345/156 |
| 2016/0070311 | A1* | 3/2016 | Geva | G06F 1/1694 345/592 |

FOREIGN PATENT DOCUMENTS

| | | |
|---|---|---|
| JP | 2002-044623 A | 2/2002 |
| JP | 2003-324402 A | 11/2003 |
| JP | 2006-270711 A | 10/2006 |
| JP | 2007-068881 A | 3/2007 |
| JP | 2008-005297 A | 1/2008 |
| JP | 2010-226484 A | 10/2010 |
| JP | 2011-155532 A | 8/2011 |
| WO | 2007/052395 A1 | 5/2007 |

* cited by examiner

FIG. 4

| EVENT | Time | PRESENCE REPRODUCTION INFORMATION |
|---|---|---|
| VIBRATION | From: 0m0sec<br>To: 8m13sec | VEHICLE TYPE: SMALL BOAT<br>VIBRATION DIRECTION: HORIZONTAL ROTATION ±20°<br>VIBRATION MAGNITUDE: AVERAGE 1.8G |
| WEATHER | From: 0m0sec<br>To: 8m13sec | COMFORT: WARM AND PLEASANT<br>WEATHER: CLEAR<br>TEMPERATURE: 29° C<br>HUMIDITY: 67%<br>WIND FORCE: SOUTHEAST 3m/s |
| LOCATION AND BEHAVIOR | From: 0m0sec<br>To: 8m13sec | NAME OF PLACE: OO RIVER<br>ATTRIBUTE OF PLACE: RIVER<br>INDOORS/OUTDOORS: OUTDOORS<br>CONTENT OF BEHAVIOR: RIDING BOAT ON RIVER<br>EAST LONGITUDE: ~°, NORTH LATITUDE: ~°<br>ALTITUDE: 427m |
| ILLUMINATION AND BRIGHTNESS | From: 0m0sec<br>To: 8m13sec | TYPE: SUNLIGHT<br>ATTRIBUTE: LIGHTING<br>COLOR: 6600K<br>BRIGHTNESS: 4800 LUMENS |
| AMBIENCE OF PLACE | From: 4m32sec<br>To: 4m43sec | Positive: 5.2<br>LIVELINESS: 8 |

FIG. 5

| EVENT | Time | PRESENCE REPRODUCTION INFORMATION |
|---|---|---|
| VIBRATION | From: 5m24sec<br>To: 7m45sec | VEHICLE TYPE: BUS ON REGULAR ROUTE |
| WEATHER | From: 0m0sec<br>To: 15m51sec | COMFORT: TREMBLING FROM COLD |
| | | WEATHER: CLEAR<br>TEMPERATURE: 3° C<br>HUMIDITY: 21%<br>WIND FORCE: SOUTHEAST 6 m/s |
| LOCATION AND BEHAVIOR | From: 45m12sec<br>To: 56m13sec | NAME OF PLACE: OO HILLS<br>ATTRIBUTE OF PLACE: BUILDING<br>INDOORS/OUTDOORS: INDOORS<br>FLOOR: 4F<br>CONTENT OF BEHAVIOR: SHOPPING |
| | | EAST LONGITUDE: ~°, NORTH LATITUDE: ~°<br>ALTITUDE: 18m |
| ILLUMINATION AND BRIGHTNESS | From: 5m34sec<br>To: 6m33sec | TYPE: FLUORESCENT LAMP<br>ATTRIBUTE: LIGHTING |
| | | COLOR: 8600K<br>BRIGHTNESS: 1800 LUMENS |
| SMELL | From: 12m34sec<br>To: 22m43sec | TYPE: ROSE |
| AMBIENCE OF PLACE | From: 4m32sec<br>To: 4m43sec | Positive: 5.2<br>LIVELINESS: 8 |
| EMOTION VALUE | From: 12m34sec<br>To: 22m43sec | WIFE: IMPORTANT<br>BABY: VERY IMPORTANT, CUTE AND AFFECTIONATE<br>MOTHER-IN-LAW: HARD TO DEAL WITH<br>SOFA: FAVORITE |
| WEIGHT | From: 6m02sec<br>To: 6m17sec | FISH: WEIGHT REQUIRING TIGHT GRASP WITH BOTH HANDS |
| TEXTURE | From: 6m02sec<br>To: 6m17sec | FISH: SLIPPERY |
| TEMPERATURE | From: 6m02sec<br>To: 6m17sec | LUKEWARM |
| TASTE | From: 21m59sec<br>To: 23m31sec | SALTY, SWEET-SMELLING, CURRY TASTE |

FIG. 10
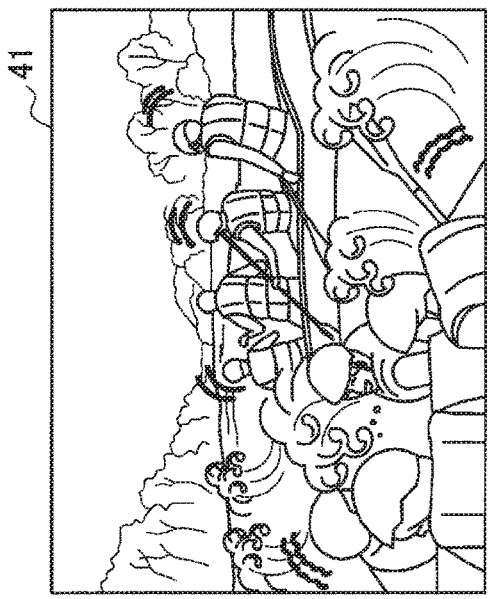
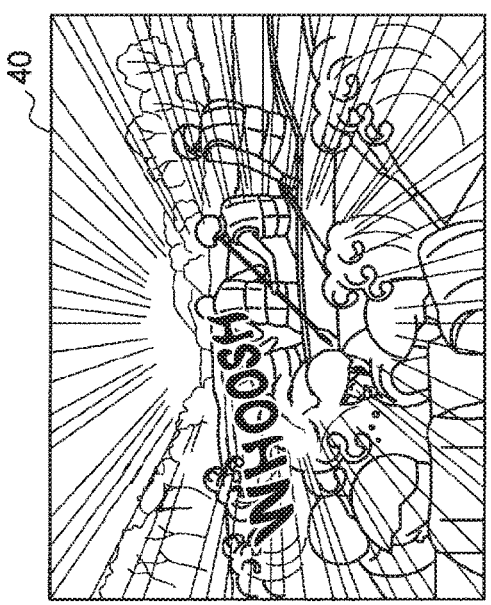

FIG. 11
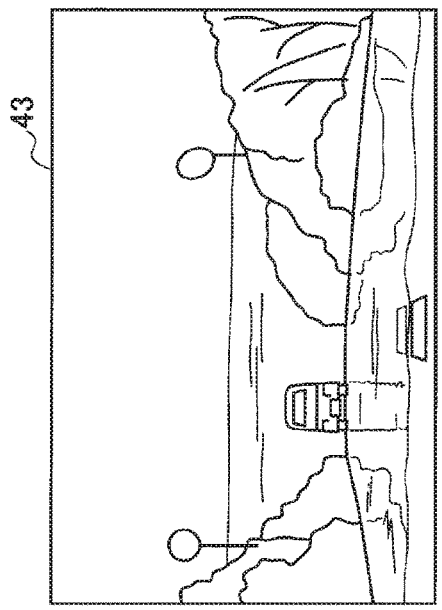
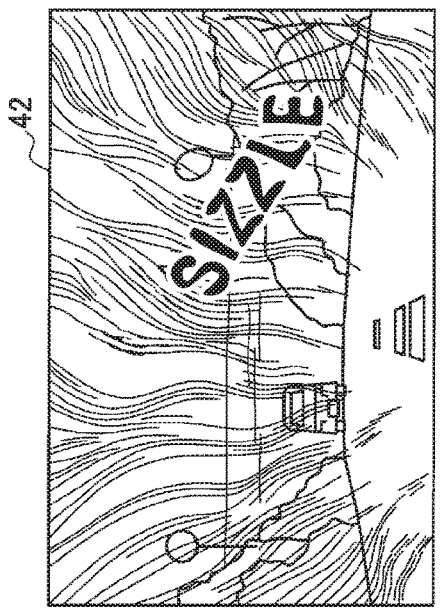

FIG. 15

| OBJECT ID | DATE AND TIME AND PERIOD | RELATED OBJECT ID | INTERACTION TYPE | DETAILS | EVALUATION (-1.0 ~ 1.0) |
|---|---|---|---|---|---|
| 312039 | 2013/12/24 | 105384093 | GAVE | GAVE ACCESSARY | 0.7 |
| 105384093 | 2013/12/24 | 312039 | RECEIVED | RECEIVED ACCESSARY | 1.00 |
| 312039 | 2014/01/12 | 101960 | STORED | COVERED INDOORS | 0.85 |
| 101960 | 2014/01/12 | 312039 | WAS STORED | COVERED INDOORS | 1.00 |
| ... | | | | | |
| 312039 | 2014/01/14 | 15122014 | PHYSICAL AFFECTION | HUG | 0.86 |
| 15122014 | 2014/01/14 | 312039 | PHYSICAL AFFECTION | HUGGED | 0.9 |
| 105384093 | 2014/05/10 | 312039 | CONVERSATION | CONTENT: SLIGHTLY NEGATIVE | -0.23 |
| 312039 | 2014/05/10 | 105384093 | CONVERSATION | CONTENT: SLIGHTLY POSITIVE | 0.12 |
| 15122014 | 2014/05/21 | 101960 | PLAY | CONCENTRATION: HIGH TIME: 20 MINUTES | 0.86 |
| 101960 | 2014/05/21 | 15122014 | PLAY | HANDLING: SLIGHTLY ROUGH TIME: 20 MINUTES | 0.3 |
| ... | | | | | |

FIG. 16

| OBJECT ID | DATE AND TIME AND PERIOD | RELATED OBJECT ID | INTERACTION TYPE | DETAILS | EVALUATION (-1.0 ~ 1.0) |
|---|---|---|---|---|---|
| 312039 | 2013/12/24 | 105384093 | GIVE | ACCESSARY | 0.7 |
| 105384093 | 2013/12/24 | 312039 | RECEIVED | RECEIVED ACCESSARY | 1.00 |
| 312039 | 2014/01/12 | 101960 | STORED | COVERED INDOORS | 0.85 |
| 101960 | 2014/01/12 | 312039 | WAS STORED | COVERED INDOORS | 1.00 |
| ... | | | | | |
| 312039 | 2014/01/14 | 15122014 | PHYSICAL AFFECTION | HUG | 0.86 |
| 15122014 | 2014/01/14 | 312039 | RECEIVED PHYSICAL AFFECTION | HUGGED | 0.9 |
| 105384093 | 2014/05/10 | 312039 | CONVERSATION | CONTENT: SLIGHTLY NEGATIVE | -0.23 |
| 312039 | 2014/05/10 | 105384093 | CONVERSATION | CONTENT: SLIGHTLY POSITIVE | 0.12 |
| ... | | | | | |

FIG. 19
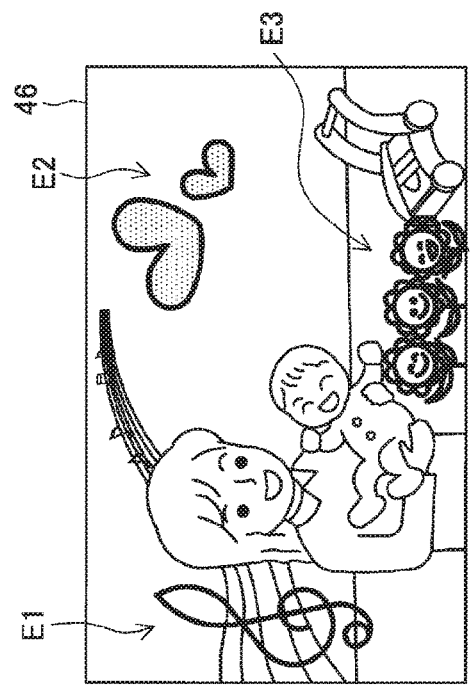
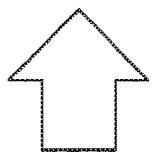
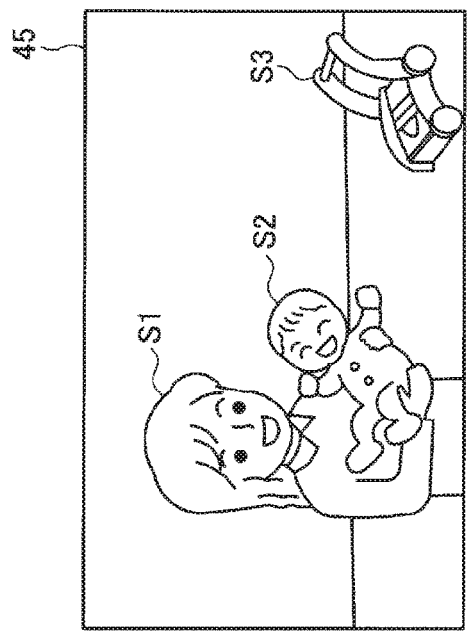

INFORMATION PROCESSING SYSTEM, CONTROL METHOD, AND STORAGE MEDIUM

CROSS REFERENCE TO RELATED APPLICATIONS

This application is a U.S. National Phase of International Patent Application No. PCT/JP2015/072218 filed on Aug. 5, 2015, which claims priority benefit of Japanese Patent Application No. JP 2014-227007 filed in the Japan Patent Office on Nov. 7, 2014. Each of the above-referenced applications is hereby incorporated herein by reference in its entirety.

TECHNICAL FIELD

The present disclosure relates to an information processing system, a control method, and a storage medium.

BACKGROUND ART

In previous moving images, only pictures and sounds were recorded and the recorded pictures and sounds were played to provide audiovisual stimuli to viewers. Furthermore, systems that provide other stimuli in addition audiovisual stimuli to cause viewers to enjoy images with high presence have recently been proposed.

For example, Patent Literature 1 below discloses an information provision device that provides vibration information synchronized with motion on a screen when a user views an image while holding a user terminal. In addition, Patent Literatures 2 to 4 below disclose information processing apparatuses that detect motion vectors through image data analysis and output the motion vectors to driving devices for driving stands such that a user has a simulated experience riding in a car, or on a boat or a horse, walking.

CITATION LIST

Patent Literature

Patent Literature 1: JP 2006-270711A
Patent Literature 2: JP 2002-44623A
Patent Literature 3: JP 2002-35437A
Patent Literature 4: JP 2000-214755A

DISCLOSURE OF INVENTION

Technical Problem

However, the technologies disclosed in Patent Literatures 2 to 4 above require exclusive chairs for reproducing vibration acquired from a moving image as it is but cannot reproduce vibration acquired from a moving image when vibration information is transmitted to a wearable terminal or a mobile device.

Furthermore, although reproduction of high-level presence is affected by various factors such as illumination of a whole viewing space, temperature, the texture of a subject, the weight of the subject and a relation between the subject and a photographer in addition to vibration, reproduction of such factors are not considered in Patent Literatures 1 to 4 described above.

In addition, although an exclusive device needs to be provided to a playback side in order to reproduce raw data such as vibration acquired from a moving image as it is, it is difficult to provide such an exclusive device.

Accordingly, the present disclosure proposes an information processing system, a control method and a storage medium through which reproduction that matches characteristics of devices of a playback side can be performed by generating abstracted presence reproduction information.

Solution to Problem

According to the present disclosure, there is provided an information processing system including: a generation unit that generates abstracted presence reproduction information depending on features extracted from content data; and a storage controller that controls the presence reproduction information generated by the generation unit to be stored in association with the content data.

According to the present disclosure, there is provided an information processing system including: an acquisition unit that acquires presence reproduction information generated on the basis of content data; an effect specifying unit that specifies effects for reproducing a context indicated by the presence reproduction information; and a playback controller that applies the specified effects to the content data and plays the content data.

According to the present disclosure, there is provided an information processing system including: a generation unit that generates abstracted presence reproduction information depending on features extracted from content data; an effect specifying unit that specifies effects for reproducing a context indicated by the presence reproduction information; and a playback controller that applies the specified effects to the content data and plays the content data.

According to the present disclosure, there is provided a control method including: generating abstracted presence reproduction information depending on features extracted from content data; and controlling the generated presence reproduction information to be stored in association with the content data.

According to the present disclosure, there is provided a storage medium having a program stored therein, the program causing a computer to function as: an acquisition unit that acquires presence reproduction information generated on the basis of content data; an effect specifying unit that specifies effects for reproducing a context indicated by the presence reproduction information; and a playback controller that applies the specified effects to the content data and plays the content data.

Advantageous Effects of Invention

According to the aforementioned present disclosure, it is possible to perform reproduction matched to characteristics of devices of a playback side by generating abstracted presence reproduction information.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is an illustration of an example of a data structure of presence reproduction information generated from a target moving image illustrated in FIG. 3.

FIG. 5 is an illustration of another example of the presence reproduction information according to the present embodiment.

FIG. 10 is an illustration of examples of image effects for presence reproduction according to the present embodiment.

FIG. 11 is an illustration of examples of image effects for presence reproduction according to the present embodiment.

FIG. 15 is an illustration of an example of interaction evaluation data according to the present embodiment.

FIG. 16 is an illustration of an example of data extracted from the example of interaction evaluation data illustrated in FIG. 15 and used for emotion value calculation.

FIG. 19 is an illustration of examples of image effects arranged to correspond to respective subjects depending on emotion values according to the present embodiment.

MODE(S) FOR CARRYING OUT THE INVENTION

Figure 1:
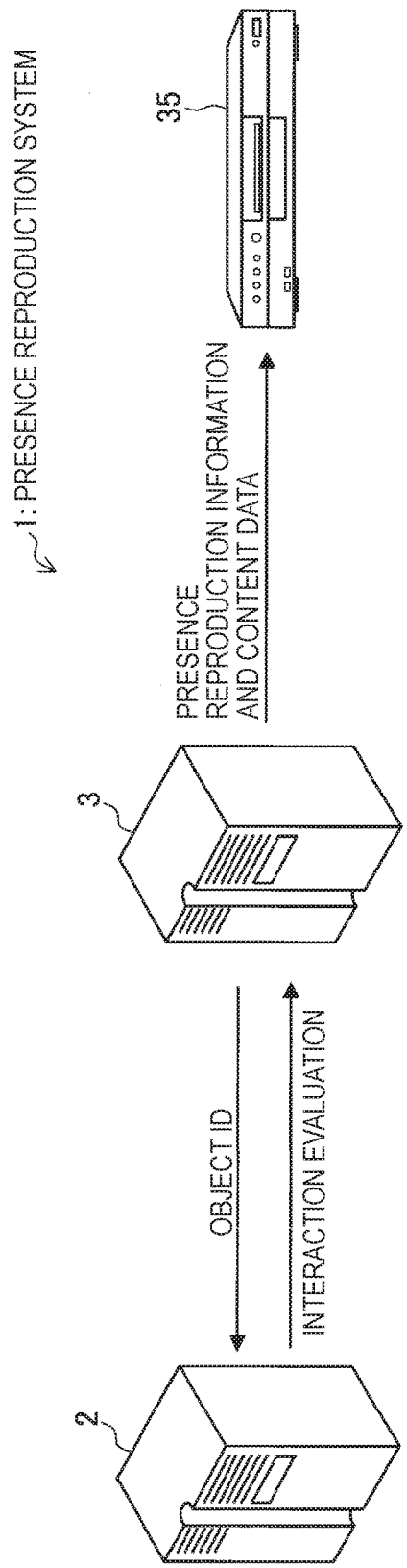
FIG. 1 is an explanatory diagram of an overview of a presence reproduction system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

In addition, description will be given in the following order.
1. Overview of presence reproduction system according to embodiment of present disclosure
2. Basic configuration
2-1. Reproduction information generation device
2-2. Emotion server
2-3. Playback control device
3. Operation processes
3-1. Reproduction information generation process
3-2. Playback process
4. Conclusion 1. Overview of Presence Reproduction System According to Embodiment of Present Disclosure First of all, an overview of a presence reproduction system 1 according to an embodiment of the present disclosure, illustrated in FIG. 1, will be described. As illustrated in FIG. 1, the presence reproduction system 1 according to the present embodiment includes a reproduction information generation device 3 for generating presence reproduction information from acquired content data and a playback control device 35 for reproducing presence when the content data is generated for a viewer (user) when the content data is played back on the basis of the presence reproduction information. The reproduction information generation device 3 and the playback control device 35 may be connected through a network.

The reproduction information generation device 3 estimates a context (specifically, vibration, weather, location/situation, illumination, ambience of place, etc.) when content data is generated, depending on feature values extracted through analysis of content data such as a moving image and generates abstracted presence reproduction information for reproducing the estimated context. In addition, the reproduction information generation device 3 according to the present embodiment may generate presence reproduction information for adding new presentation that represents a feeling toward a subject using a predetermined index indicating a feeling toward or relationship with the subject of a content data creator (e.g., a photographer). The predetermined index is an emotion value calculated on the basis of an evaluation history of interactions (behaviors) performed by a target person with respect to other persons or objects. The reproduction information generation device 3 acquires, from the emotion server 2, evaluation of an interaction performed between a subject and a photographer on the basis of object IDs of the subject and the photographer and calculates an emotion value.

Here, the abstracted presence reproduction information is generated on the basis of raw data such as vibration acquired from an image and, for example, information indicating a vehicle type such as "riding a large ship", "riding a small boat", "riding in a car" or "riding a bicycle" is generated as abstracted presence reproduction information from a pattern such as vibration.

The playback control device 35 provides presence to a user by reproducing vibration, weather, location, behavior, illumination, ambience of place and the like when the content data is generated on the basis of presence reproduction information associated with content data when the content data is played. Since the presence reproduction information associated with the content data has been abstracted as described above, the playback control device 35 may perform a reproduction process depending on characteristics of available devices. For example, when the presence reproduction information is information indicating a vehicle type, the playback control device 35 may provide the user with vibration as if the user were riding a target vehicle through a vibration device for generating vibration or provide the user with wind that would blow if the user were riding the target vehicle through a wind output device for generating wind. Additionally, in the control of the vibration device, it is desirable to provide the user with vibration as if the user were riding the target vehicle through vibration control that is possible for the vibration device instead of reproducing raw data such as vibration acquired from a moving image as it is. Accordingly, it is possible to reproduce presence depending on characteristics of devices provided on a reproduction side in accordance with abstracted presence reproduction information without an exclusive device in the present embodiment in contrast to the previous technology in which the reproduction side needs to include an exclusive device for reproducing raw data such as vibration acquired from a moving image.

The overview of the presence reproduction system according to an embodiment of the present disclosure has been described. In the present embodiment, it is possible to perform reproduction that matches characteristics of devices of a playback side by generating presence reproduction information having a high abstraction level on the basis of content data such as a moving image. Next, a basic configuration of each device included in the presence reproduction system 1 of the present embodiment will be described.

2. Basic Configuration

<2-1. Reproduction Information Generation Device>

Figure 2:
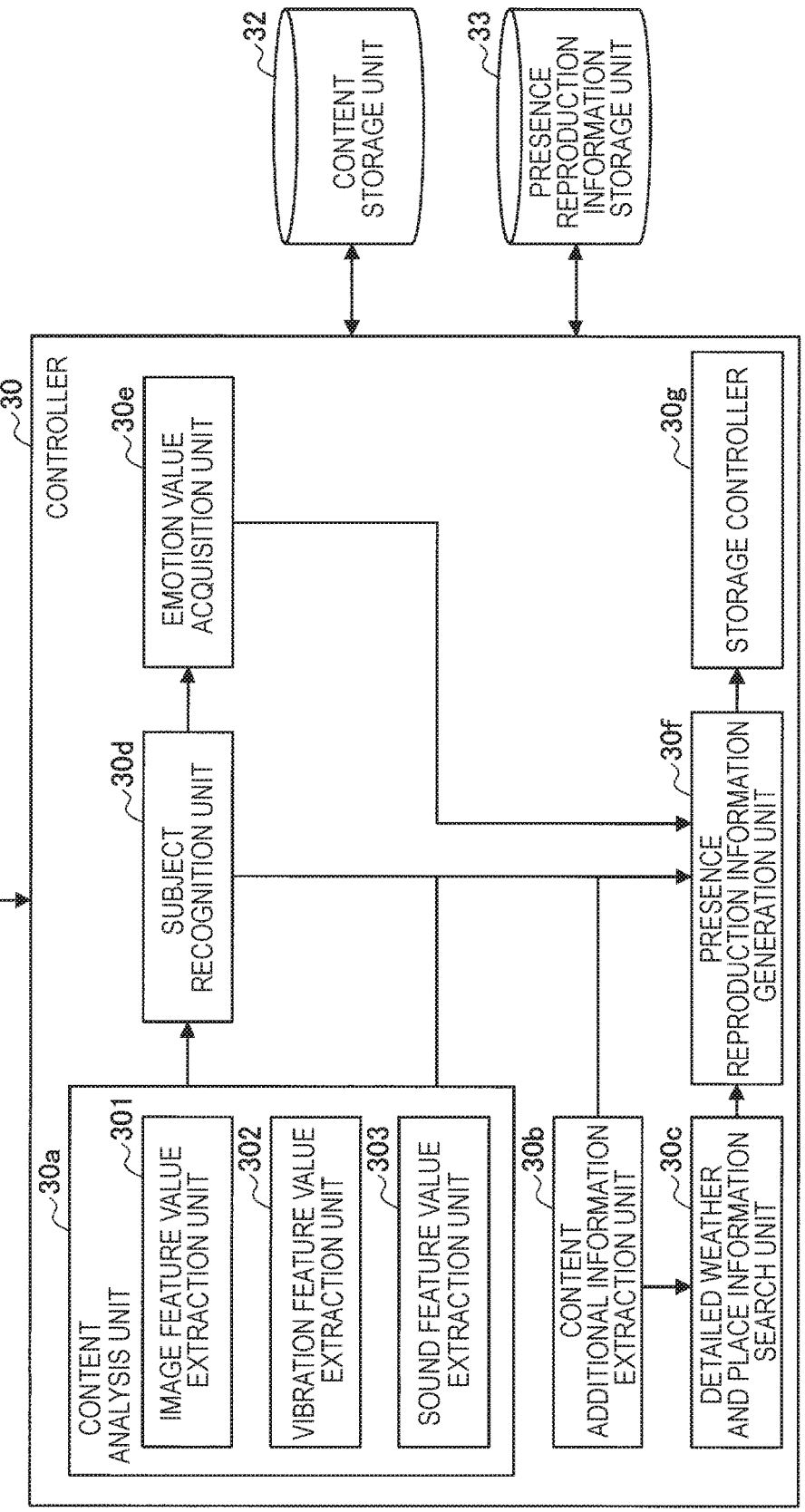
FIG. 2 is a block diagram illustrating an example of a configuration of a reproduction information generation device according to the present embodiment.

FIG. 2 is a block diagram illustrating an example of a configuration of the reproduction information generation device 3 according to the present embodiment. As illustrated in FIG. 2, the reproduction information generation device 3 includes a controller 30, communication unit 31, a content storage unit 32 and a presence reproduction information storage unit 33.

(Controller)

The controller 30 controls each component of the reproduction information generation device 3. The controller 30 is realized by a micro-computer including a central processing unit (CPU), a read only memory (ROM), a random access memory (RAM) and a nonvolatile memory. Specifically, the controller 30 functions as a content analysis unit 30a, a content additional information extraction unit 30b, a detailed weather and place information search unit 30c, a subject recognition unit 30d, an emotion value acquisition unit 30e, a presence reproduction information generation unit 30f, and a storage controller g, as illustrated in FIG. 2.

The content analysis unit 30a performs image analysis and sound analysis for content data such as a moving image. Content data may be stored in the content storage unit 32 or may be received through the communication unit 31. The content analysis unit 30a includes an image feature value extraction unit 301, a vibration feature value extraction unit 302 and a sound feature value extraction unit 303.

The image feature value extraction unit 301 has a function of extracting an image feature value on the basis of image analysis. The vibration feature value extraction unit 302 has a function of extracting a vibration feature value on the basis of image analysis. In addition, the sound feature value extraction unit 303 has a function of extracting a sound feature value on the basis of sound analysis. Such feature values may be extracted for each frame of a moving image or extracted for a predetermined number of frames. The content analysis unit 30a outputs the feature value extracted through each extraction unit on the basis of an analysis result to the subject recognition unit 30d and the presence reproduction information generation unit 30f.

The content additional information extraction unit 30b extracts additional information from content data. The additional information is information stored when the content data is generated (during photography in the case of a moving image) and may be, for example, date information (photographing date in the case of a moving image), time information and position information (latitude, longitude and altitude) of the content data, sensor information acquired when the content data is generated and the like. It will be assumed that the additional information is embedded in the content data as metadata. The content additional information extraction unit 30b outputs the extracted additional information to the detailed weather and place information search unit 30c and the presence reproduction information generation unit 30f.

The detailed weather and place information search unit 30c searches for detailed weather information and detailed place information on a content generation place on the basis of the date, time and place of the content data extracted by the content additional information extraction unit 30b. The detailed weather information may be weather, temperature, humidity, wind direction, wind power, rainfall and the like. The detailed place information may be a station name, a facility name, a place name, a building type and the like. The detailed weather and place information search unit 30c accesses a search server (reverse geo-coding system, event calendar server or the like) on a network to search for such detailed weather and place information. In addition, the detailed weather and place information search unit 30c outputs the detailed weather and place information that it finds to the presence reproduction information generation unit 30f.

The subject recognition unit 30d recognizes a subject of the content data on the basis of the image feature value extracted by the image feature value extraction unit 301 of the content analysis unit 30a or the sound feature value extracted by the sound feature value extraction unit 303. When the content data is a moving image, for example, the subject recognition unit 30d recognizes the type of a subject (person or object) in a frame, a position in an image, a region and an outline on the basis of an image feature value of the frame. The subject recognition unit 30d outputs information on the recognized subject to the emotion value acquisition unit 30e.

The emotion value acquisition unit 30e acquires emotion values of the content data creator (a photographer in the case of a moving image) and the subject. Specifically, for the emotion server 2, the emotion value acquisition unit 30e requests acquisition of emotion values on the basis of an object ID of the creator and an object ID of the subject. When evaluation of an interaction between the creator and the subject is transmitted from the emotion server 2, the emotion value acquisition unit 30e calculates a relative emotion value (an index indicating a creator's feeling toward the subject) of the creator with respect to the subject on the basis of the interaction evaluation. Emotion value calculation may be performed in the emotion server 2. In this case, the emotion value acquisition unit 30e acquires the calculated emotion value from the emotion server 2 through the communication unit 31.

The object ID of the creator may be embedded in the content data as metadata and extracted by the content additional information extraction unit 30b. The object ID of the subject may be embedded in the content data as metadata and extracted by the content additional information extraction unit 30b. Otherwise, the object ID of the subject may be acquired on the basis of the feature value of the subject recognized by the subject recognition unit 30d. Matching of the subject feature to the object ID may be stored in a storage unit (not shown) of the reproduction information generation device 3 or stored in an object DB 22 of the emotion server 2. The emotion value acquisition unit 30e may acquire the object ID of the subject by transmitting the subject feature value to the emotion server 2. The emotion value acquisition unit 30e outputs the acquired emotion value to the presence reproduction information generation unit 30f.

The presence reproduction information generation unit 30f generates information for providing presence of the content data to a viewer (user) when the content data is played. The presence reproduction information generation unit 30f outputs the generated presence reproduction data to the storage controller 30g. Hereinafter, the presence reproduction information generated according to the present embodiment will be described in detail with reference to FIGS. 3 to 5.

Figure 3:
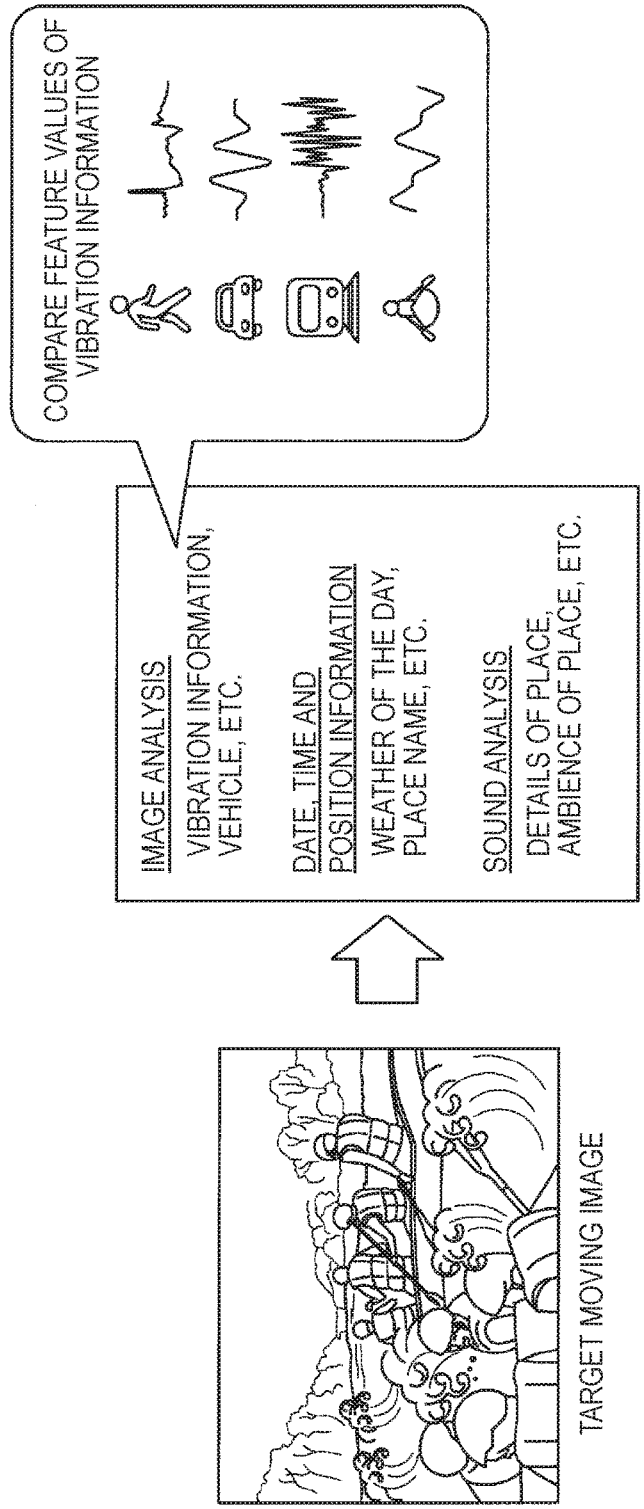
FIG. 3 is an explanatory diagram of generation of presence reproduction information according to the present embodiment.

FIG. 3 is an explanatory diagram of generation of the presence reproduction information according to the present embodiment. As illustrated in FIG. 3, when content data is a moving image of riding a boat on a river, the presence reproduction information generation unit 30f generates vibration information, speed information, vehicle type and the like as presence reproduction information from image feature values extracted through image analysis by the content analysis unit 30e. Regarding the vibration information, vibration applied to a photographer during photography may be extracted using a difference between frames of the picture, for example. In addition, after a vibration component is removed from the moving image, moving speeds in up/down, left/right and forward/backward directions may be estimated depending on degrees of panning and zooming of the entire screen. Information of vibration is represented by time variations in a lateral moving speed and an angular velocity in up/down, left/right and forward/backward directions. By comparing the vibration information with previously measured vibration information of various vehicles or motions, the vibration information can be replaced by abstract data (e.g., vehicle type or motion type) indicating a vehicle or motion that outputs similar waveforms, instead of waveforms themselves (raw data). Meanwhile, features of waveforms may be acquired through magnitude of shaking, frequency, a time variation pattern and the like.

Furthermore, the presence reproduction information generation unit 30f may use, as presence reproduction information, weather (environment) of the moving image photographing date, the name of the photographing place and the like, found by the detailed weather and place information search unit 30c through inquiry to a predetermined server or system through the Internet on the basis of the moving image photographing date and time and position information extracted by the content additional information extraction unit 30b. In addition, detailed weather and place information may be acquired more accurately through combination with image analysis. For example, position information according to the Global Positioning System (GPS) is not always so accurate and thus there may be a case in which a person is riding on a boat on the river and a case in which the person is barbequing by the river even though position information indicates that the person is located at the riverside, for example. Accordingly, a correct place near a boundary line can be estimated with reference to an image analysis result.

Moreover, the presence reproduction information generation unit 30f may generate details of the place, ambience of the place, liveliness and the like as presence reproduction information from results (sound feature values and image feature values) of analysis of sounds and images by the content analysis unit 30a. For example, the presence reproduction information generation unit 30f may estimate, from a sound feature value, details of the place, ambience of the place, and liveliness, such as whether the relevant place is an indoor place or an outdoor place and the size and material of a room in the case of an indoor place. Furthermore, accuracy of such estimation may be increased through combination with image analysis.

In addition, the presence reproduction information generation unit 30f may estimate a location and a behavior when the content data is generated on the basis of the analysis result of the content analysis unit 30a, detailed weather and place information found by the detailed weather and place information search unit 30c and additional information extracted by the content additional information extraction unit 30b and use the estimated location and behavior as presence reproduction information. The location and behavior when the content data is generated correspond to indoors/outdoors, place, temperature, brightness, content of the behavior and the like, and these are generated as presence reproduction information.

Furthermore, the presence reproduction information generation unit 30f may generate an emotion value of the photographer with respect to each subject as presence reproduction information on the basis of emotion values acquired by the emotion value acquisition unit 30e.

FIG. 4 is an illustration of an example of a data structure of the presence reproduction information generated from the target moving image illustrated in FIG. 3. The presence reproduction information generation unit 30f according to the present embodiment creates a data structure formed in a specific format. Specifically, as shown in FIG. 4, a data stream is generated for each event (i.e., context) in a format based on a predetermined storage form. Furthermore, the stored presence reproduction information may accompany raw data in addition to abstracted reproduction information.

For example, as presence reproduction information of vibration, raw data of vibration such as a vibration direction of horizontal rotation±20° and vibration magnitude of 1.8 G, and abstract data "vehicle type: small boat" which indicates what generates the vibration (motion) are generated for 0 m 0 sec to 8 m 13 sec in the moving image content. The presence reproduction information of vibration may be generated on the basis of a vibration feature value extracted by the vibration feature value extraction unit 302.

In addition, as presence reproduction information of weather, raw data of weather, such as weather, temperature, humidity and wind force, and abstract data "comfort: warm and pleasant" which indicates comfort estimated from such weather data are generated for 0 m 0 sec to 8 m 13 sec in the moving image content. The presence reproduction information of weather may be generated on the basis of detailed weather and place information found by the detailed weather and place information search unit 30c. Furthermore, comfort may be generated on the basis of subjective comfort manually input by a person who photographs the moving image. Raw data of weather, such as weather, temperature, humidity and wind force, is added as subsidiary information in consideration of the fact that such subjective data is not input.

Furthermore, as presence reproduction information of location and situation, geographical raw data, such as latitude, longitude and altitude, abstract location data "place name: OO river, place attribute: river, indoors/outdoors: outdoors" found among such geographical information, and abstract situation data "situation: rafting" which indicates what is performed in the location are generated for 0 m 0 sec to 8 m 13 sec in the moving image content. Such presence reproduction information of location and situation may be generated on the basis of additional information extracted by the content additional information extraction unit 30b and detailed weather and place information found by the detailed weather and place information search unit 30c. In addition, place attributes correspond to geographical attributes such as river, ocean, city, suburb, paved road and gravel road and attributes of structures such as department, gymnasium, school and station.

In addition, as presence reproduction information of illumination and brightness, raw data of colors and brightness and abstract brightness type and attribute data "type: sunlight, attribute: lighting" estimated from the raw data are generated for 0 m 0 sec to 8 m 13 sec in the moving image content. Such presence reproduction information of illumination and brightness may be generated on the basis of the additional information extracted by the content additional information extraction unit 30b and the detailed weather and place information found by the detailed weather and place information search unit 30c. In addition, attributes of brightness may be "flickering", "rotating" and the like in addition to "lighting".

Furthermore, as presence reproduction information of ambience of place, abstract place ambience data "Positive: 5.2, liveliness:8" is generated for 4 m 32 sec to 4 m 43 sec in the moving image content. Such presence reproduction information of ambience of place may be generated on the basis of an analysis result (particularly, an image feature value and a sound feature value) of the content analysis unit 30a and a subject recognition result of the subject recognition unit 30d. Ambience of place may be a degree of a positive/negative mode, a degree of liveliness/calmness and the like.

Examples of presence reproduction information generated from the target image illustrated in FIG. 3 have been described above. A plurality of events of the same type may be assigned to one piece of content data in order to cope with a case in which weather changes during an activity, and the like.

Furthermore, although the presence reproduction information shown in FIG. 4 is generated for all of the target moving image content, it may be generated for each frame. In addition, while FIG. 4 shows the format in which a data stream of the presence reproduction information is assigned per event, the format of the presence reproduction information according to the present embodiment is not limited to the example shown in FIG. 4 and may be a format in which target presence reproduction information is added to a time zone having a large variation in simple time series data of the moving image content, for example.

Furthermore, the presence reproduction information shown in FIG. 4 is an example and presence reproduction information of events of more various types may be generated. This will be described below with reference to FIG. 5.

FIG. 5 is an illustration of other examples of the presence reproduction information according to the present embodiment. Since the presence reproduction information of "vibration," "weather," "location and situation," "illumination and brightness" and "ambience of place" shown in FIG. 5 has been described with reference to FIG. 4, description thereof is omitted. Hereinafter, other presence reproduction information will be described.

As shown in FIG. 5, as presence reproduction information of smell, abstract data "type: rose" which indicates a smell is generated for 12 m 34 sec to 22 m 43 sec in the moving image content. Such presence reproduction information of smell may be generated on the basis of an analysis result (particularly, an image feature value) of the content analysis unit 30a and a search result of the detailed weather and place information search unit 30c. In addition, when there are a plurality of smells at the same time, a plurality of smell events may be provided.

As presence reproduction information of emotion values, abstract subjective expressions "wife: important, baby: very important, cute, affectionate, mother-in-law: hard to deal with, sofa: favorite" estimated from relative emotion values of the photographer with respect to subjects is generated for 12 m 34 sec to 22 m 43 sec in the moving image content. Such presence reproduction information of emotion values may be generated on the basis of emotion values acquired by the emotion value acquisition unit 30e. Furthermore, acquired relative emotion values of the photographer with respect to subjects may be added as raw data in addition to the abstract subjective expression.

In addition, as presence reproduction information of weight, abstract expressions of the weight of an object held by a subject, "fish: weight requiring tight grasp with both hands," is generated for 6 m 02 sec to 6 m 17 sec in the moving image content. Such presence reproduction information of weight may be generated on the basis of an analysis result of the content analysis unit 30a and a subject recognition result of the subject recognition unit 30d. For example, the presence reproduction information generation unit 30f may recognize the object held by the subject on the basis of an image feature value and estimate the weight of the object from normal weight information of the recognized object and the size of the recognized object or estimate the weight from a voice of the subject, such as "It's heavy!," on the basis of a sound feature value. Furthermore, the value of the estimated weight of the object may be added as raw data in addition to the abstract expression of the weight.

In addition, as presence reproduction information of touch, an abstract expression of the texture of the object held by the subject, "fish: slippery," is generated for 6 m 02 sec to 6 m 17 sec in the moving image content. Such presence reproduction information of touch may be generated on the basis of the analysis result of the content analysis unit 30a and the subject recognition result of the subject recognition unit 30d. For example, the presence reproduction information generation unit 30f may recognize the object held by the subject on the basis of an image feature value and estimate the touch of the object from normal touch information of the recognized object or estimate the touch from a voice of the subject, such as "It's slippery!," on the basis of a sound feature value.

Furthermore, as presence reproduction information of temperature, an abstract expression of the temperature of the object held by the subject, "fish: lukewarm," is generated for 6 m 02 sec to 6 m 17 sec in the moving image content. Such presence reproduction information of temperature may be generated on the basis of the analysis result of the content analysis unit 30a and the subject recognition result of the subject recognition unit 30d. For example, the presence reproduction information generation unit 30f may recognize the object held by the subject on the basis of the image feature value and estimate the temperature of the object from normal temperature information of the recognized object or estimate the temperature of the held object from a voice of the subject, such as "It's lukewarm," on the basis of a sound feature value.

In addition, as presence reproduction information of taste, an abstract expression of the taste of food eaten by the subject, "grilled fish: salty," is generated for 21 m 59 sec to 23 m 31 sec in the moving image content. Such presence reproduction information of taste may be generated on the basis of the analysis result of the content analysis unit 30a and the subject recognition result of the subject recognition unit 30d. For example, the presence reproduction information generation unit 30f may recognize the food eaten by the subject on the basis of an image feature value and estimate the taste of the food from normal taste information of the recognized food or estimate the taste of the food from a voice of the subject, such as "It's salty," on the basis of a sound feature value. Furthermore, when the content additional information extraction unit 30b extracts taste information (sensed information of a taste sensor attached to a tool used when food is eaten and the like) acquired when the moving image is photographed from metadata of the moving image content, the abstract expression of taste may be provided on the basis of the taste information.

The storage controller 30g may embed the presence reproduction information generated by the presence reproduction information generation unit 30f in content data stored in the content storage unit 32 or store the presence reproduction information in the presence reproduction information storage unit 33 as a separate file in association with the content data.

(Communication Unit)

The communication unit 31 transmits/receives data to/from an external device. For example, the communication unit 31 is connected to the emotion server 2 and receives interaction evaluation corresponding to an object ID. In addition, the communication unit 31 is connected to the playback control device 35 and transmits content data having presence reproduction information embedded therein or the content data and presence reproduction information associated therewith.

(Content Storage Unit)

The content storage unit 32 stores content data. Stored content data may be data received through the communication unit 31.

(Presence Reproduction Information Storage Unit)

The presence reproduction information storage unit 33 stores presence reproduction information generated as separate files in association with content data.

<2-2. Emotion Server>

Figure 6:
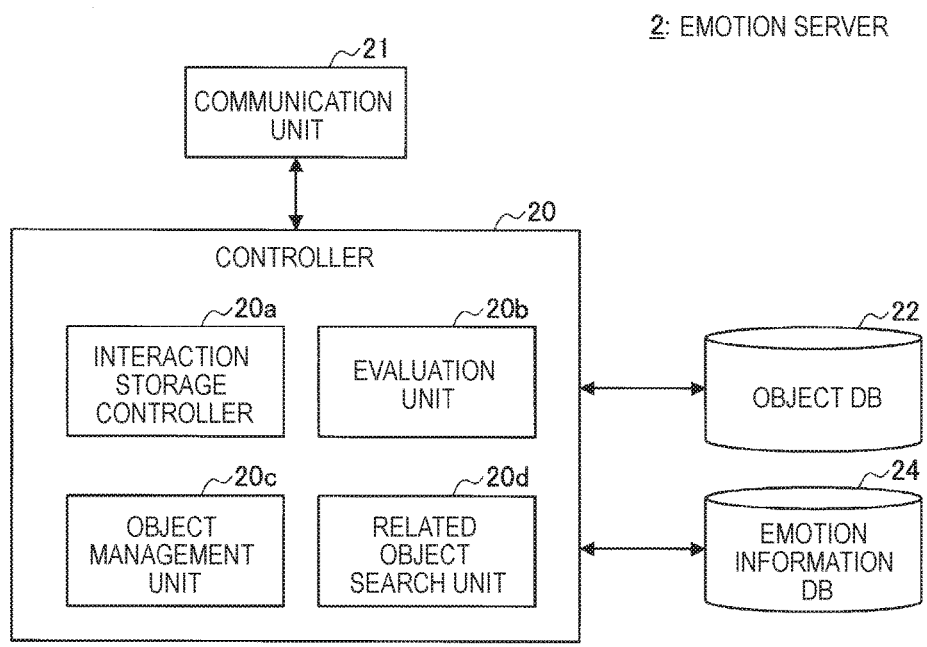
FIG. 6 is a block diagram illustrating an example of a configuration of an emotion server according to the present embodiment.

FIG. 6 is a block diagram illustrating an example of a configuration of the emotion server 2 according to the present embodiment. As illustrated in FIG. 6, the emotion server 2 includes a communication unit 21, a controller 20, an object DB 22 and an emotion information DB 24.

The communication unit 21 is connected to the reproduction information generation device 3 through the network and returns interaction evaluation associated with the object ID of the target user designated by the reproduction information generation device 3. In addition, the communication unit 21 receives interaction information from a sensing device (not shown) attached to/mounted on each object (person or object).

The controller 20 controls each component of the emotion server 2. Furthermore, the controller 20 is realized by a micro-computer including a CPU, a ROM, a RAM and a nonvolatile memory. In addition, the controller 20 according to the present embodiment serves as an interaction storage controller 20a, an evaluation unit 20b, an object management unit 20c and a related object search unit 20d.

The interaction storage controller 20a controls interaction information received from a sensing device attached to/mounted on an object to be stored in the emotion information DB 24. The sensing device is realized by a humidity sensor, a temperature sensor, a vibration sensor, an infrared sensor, a camera, a tactile sensor, a gyro sensor or the like and senses an interaction of an object with another object.

The evaluation unit 20b evaluates interactions stored in the emotion information DB 24. Although an interaction evaluation method is not particularly limited, the evaluation unit 20b evaluates an interaction applied to an object as higher when the interaction is more desirable for the object, for example, and specifically assigns a score in the range of ?1.0 to 1.0 thereto. The evaluation result is correlated with the interaction and stored in the emotion information DB 24.

The object management unit 20c performs management such as registration, change and deletion of information about objects stored in the object DB 22.

The related object search unit 20d searches the object DB 22 and the emotion information DB 24 for an object for which an interaction is generated with respect to a requested object ID as a related object.

The object DB 22 is a storage unit that stores an object ID of each object. In addition, the object DB 22 stores various types of information about objects, such as product names, product types, maker names (or IDs), model numbers, and manufacturing date and time, in addition to object IDs.

The emotion information DB 24 is a storage unit that stores an interaction between objects and evaluation of the interaction.

<2-3. Playback Control Device>

Next, a configuration of a playback side will be described. On the playback side, it is possible to freely decide a reproduction method that matches characteristics of devices provided on the playback side on the basis of abstract vibration information, for example, abstract information such as "vehicle type: boat" and "motion: rough," described in presence reproduction information generated by the reproduction information generation device 3. Accordingly, presence can be provided to a user without an exclusive device for reproducing raw data such as vibration itself.

Figure 7:
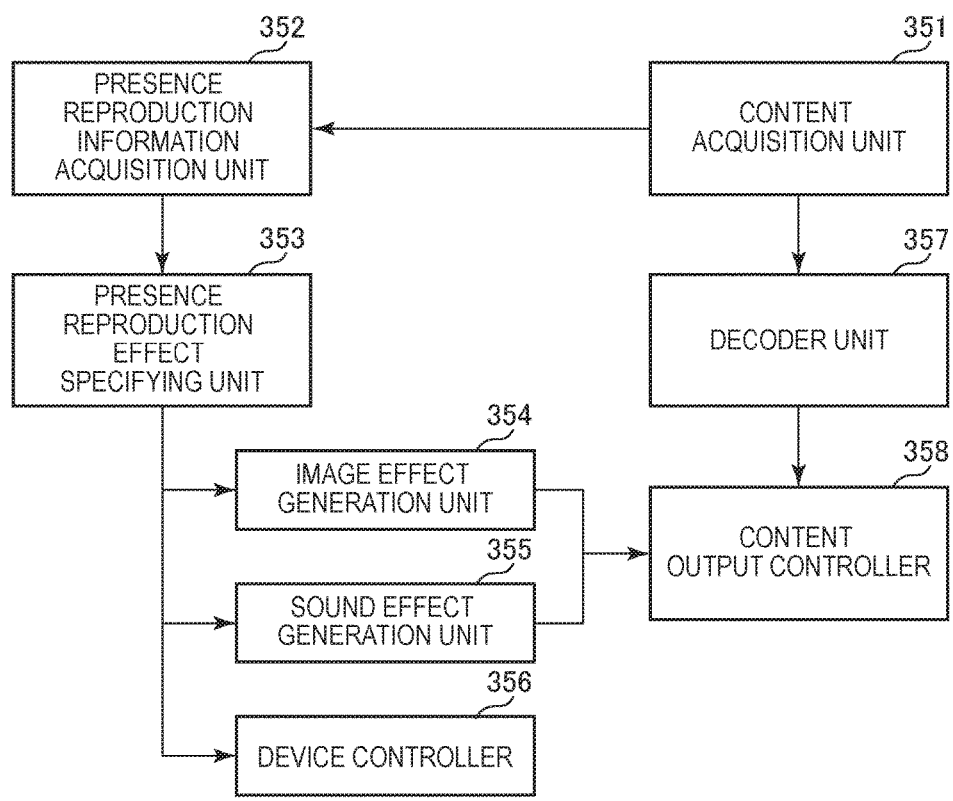
FIG. 7 is a block diagram illustrating an example of a configuration of a playback control device according to the present embodiment.

FIG. 7 is a block diagram illustrating an example of a configuration of the playback control device 35 according to the present embodiment. As illustrated in FIG. 7, the playback control device 35 includes a content acquisition unit 351, a presence reproduction information acquisition unit 352, a presence reproduction effect specifying unit 353, an image effect generation unit 354, a sound effect generation unit 355, a device controller 356, a decoder unit 357 and a content output controller 358.

The content acquisition unit 351 acquires content data to be played. For example, the content acquisition unit 351 acquires content data from a cloud (e.g., the content storage unit 32 of the reproduction information generation device 3).

The presence reproduction information acquisition unit 352 acquires presence reproduction information corresponding to the content data to be played. For example, it is assumed that the presence reproduction information has been embedded in the content data or has been stored on a cloud as a file separately from the content data. The presence reproduction information acquisition unit 352 acquires the presence reproduction information from metadata embedded in the content data acquired by the content acquisition unit 351 or acquires the presence reproduction information associated with the content data from a cloud (e.g., the presence reproduction information storage unit 33 of the reproduction information generation device 3).

The presence reproduction effect specifying unit 353 specifies devices with which presence (context indicated by the presence reproduction information) will be reproduced depending on the presence reproduction information acquired by the presence reproduction information acquisition unit 352 and characteristics of devices provided at the playback side. In addition, the presence reproduction effect specifying unit 353 decides a reproduction method to be performed in the specified devices.

Figure 8:
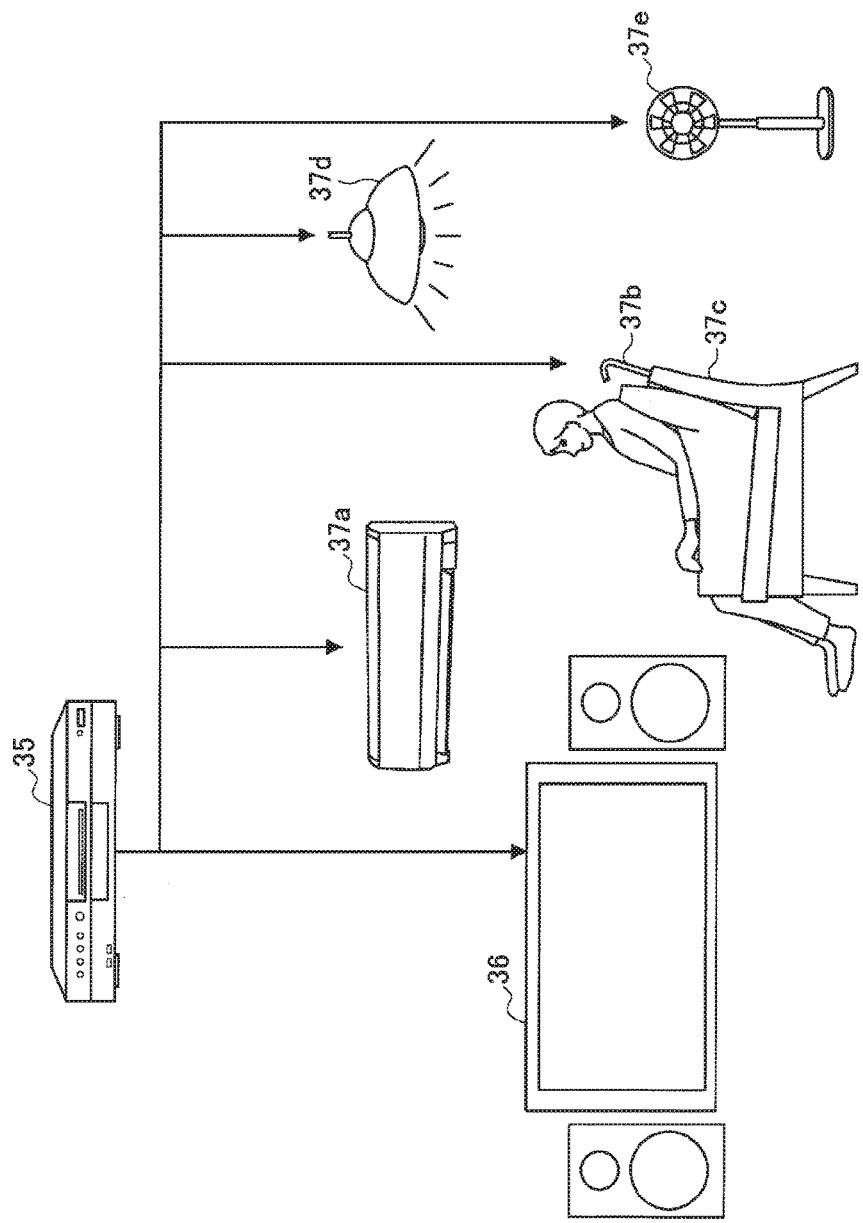
FIG. 8 is an explanatory diagram of an example of an indoor playback device according to the present embodiment.

Here, examples of devices provided at the playback side will be described with reference to FIGS. 8 and 9. FIG. 8 is an explanatory diagram of an example of an indoor playback device (actuator) according to the present embodiment. As illustrated in FIG. 8, when content data is played indoors, the playback control device 35 may use a television device 36 outputting images and sounds, an air-conditioner device 37a, an aroma spraying device 37b, a vibrating device 37c, an illumination device 37d or a blowing device 37e.

If weather described in presence reproduction information is reproduced, for example, the presence reproduction effect specifying unit 353 may actually create wind or adjust the temperature with the air-conditioner device 37a or the blowing device 37e. In addition, the presence reproduction effect specifying unit 353 may control the aroma spraying device 37b if a smell described in presence reproduction information is reproduced, control the vibrating device 37c if vibration is reproduced and control the illumination device 37d if location or illumination and brightness are reproduced.

Meanwhile, the devices are not limited to the example illustrated in FIG. 8 and, for example, a humidification device, a taste presentation device, a touch presentation device, a weight presentation device or the like may be provided.

Since it is assumed that characteristics, capabilities and types of devices provided at the playback side are different in houses, the presence reproduction effect specifying unit 353 may change the expression method to another expression method and present the changed expression method if there is no device that can directly reproduce the presence reproduction information.

Figure 9:
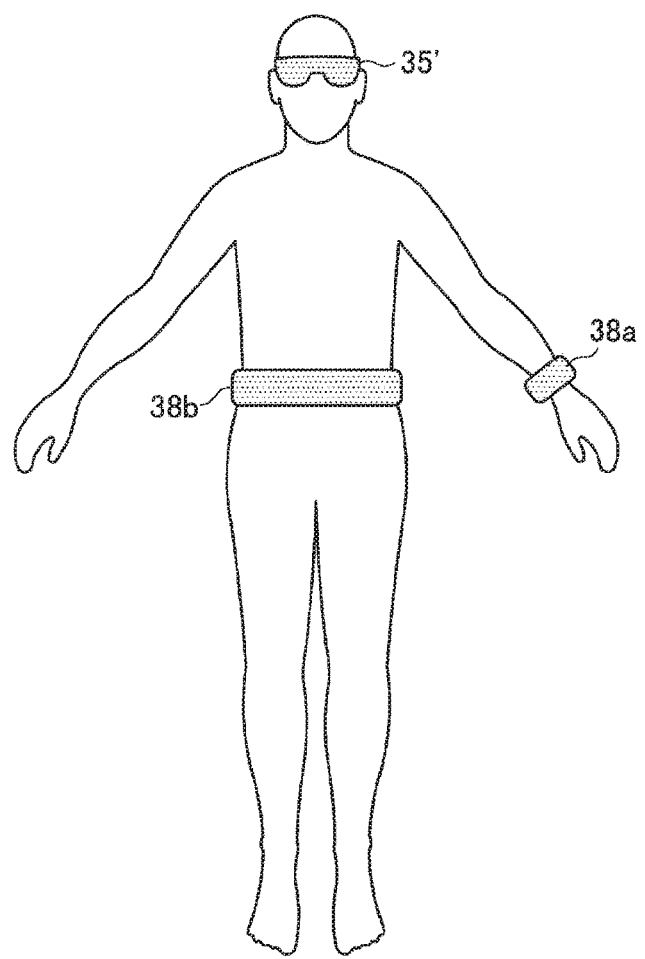
FIG. 9 is an explanatory diagram of an example of a wearable type playback device according to the present embodiment.

FIG. 9 is an explanatory diagram of examples of a wearable type playback device according to the present embodiment. As illustrated in FIG. 9, for example, a playback control device 35' realized by a head mounted display (HMD) and wearable devices 38a and 38b may be considered as a wearable type playback device.

The playback control device 35' includes the components illustrated in FIG. 7 and further has a display output function, a sound output function, a temperature control function, a vestibular electric stimulating function (inclination illusion), an aroma spraying function and the like. In addition, the wearable device 38a is a wristband type as illustrated in FIG. 9 and has a temperature control function, a muscular intensification function, a vibrating function, an electric stimulating function and the like, for example. Furthermore, the wearable device 38b is worn on the body as illustrated in FIG. 9 and has a temperature control function, a muscular intensification function, a vibrating function, an electric stimulating function and the like, for example. The aforementioned temperature control function is realized by a Peltier element, for example.

Although wearable type playback devices have a higher degree of convenience than indoor playback devices because they can be used outdoors, it is assumed that wearable type playback devices have insufficient functions compared to indoor playback devices. For example, when vibration is provided through the wearable devices 38a and 38b, it is considered that only weak stimuli are partially applied to the arm, waist and the like and thus an event described in presence reproduction information is not sufficiently reproduced. In this case, the presence reproduction effect specifying unit 353 may provide more sufficient presence by adding effects through the image effect generation unit 354 and the sound effect generation unit 355, which will be described below, in addition to vibration through the wearable devices 38a and 38b, for example.

The image effect generation unit 354 generates image effects for reproducing presence in accordance with an instruction of the presence reproduction effect specifying unit 353.

The sound effect generation unit 355 generates sound effects for reproducing presence in accordance with an instruction of the presence reproduction effect specifying unit 353.

The device controller 356 controls various devices in accordance with instructions of the presence reproduction effect specifying unit 353 and provides presence to the user (viewer). For example, the device controller 356 controls at least any of the air-conditioner device 37a, the aroma spraying device 37b, the vibrating device 37c, the illumination device 37d and the blowing device 37e.

The decoder unit 357 decodes content data acquired by the content acquisition unit 351 and outputs the decoded content data to the content output controller 358.

The content output controller 358 outputs the content data decoded by the decoder unit 357. Specifically, when the content data is a moving image, for example, the content output controller 358 controls the television device 36 to play the moving image. Furthermore, the content output controller 358 plays the moving image with image effects generated by the image effect generation unit 354 or outputs sound effects generated by the sound effect generation unit 355.

Here, examples of image effects for presence reproduction according to the present embodiment are illustrated in FIGS. 10 and 11. An effect image 40 shown on the left in FIG. 10 represents speed by effect lines and an ideophone and an effect image 41 shown on the right in FIG. 10 represents a vibrating state by effect lines. Furthermore, an effect image 42 shown on the left in FIG. 11 expresses heat by effect lines and an ideophone and an effect image 43 shown on the right in FIG. 11 similarly expresses heat by a mirage (road mirage). In addition, the image effects illustrated in FIGS. 10 and 11 are examples and may represent liveliness of a place using an onomatopoeia and express hot air (heat) by heat haze, for example.

The configuration of the playback control device 35 according to the present embodiment has been described in detail. Next, a reproduction information generation process and a playback process of the presence reproduction system 1 according to the present embodiment will be sequentially described.

3. Operation Processes

<3-1. Reproduction Information Generation Process>

Figure 12:
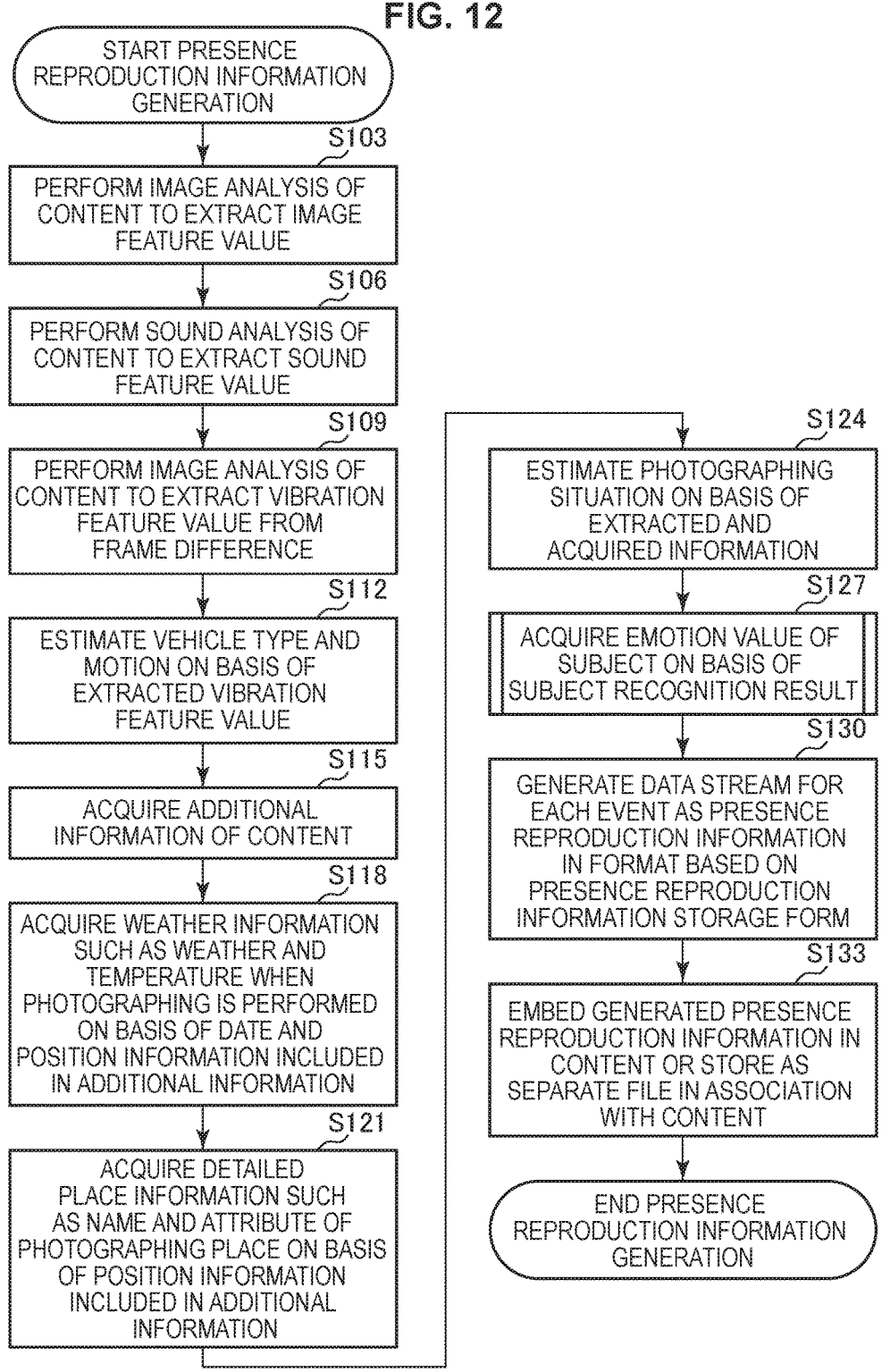
FIG. 12 is a flowchart illustrating a presence reproduction information generation process according to the present embodiment.

FIG. 12 is a flowchart illustrating a presence reproduction information generation process according to the present embodiment. As illustrated in FIG. 12, first of all, the image feature value extraction unit 301 of the reproduction information generation device 3 performs image analysis of content to extract an image feature value in step S103.

Then, the sound feature value extraction unit 303 performs sound analysis of the content to extract a sound feature value in step S106.

Subsequently, the vibration feature value extraction unit 302 performs image analysis of the content to extract a vibration feature value from a frame difference in step S109.

Thereafter, the presence reproduction information generation unit 30f estimates what the vibration is, vehicle type and motion on the basis of the vibration feature value extracted by the vibration feature value extraction unit 302 in step S112.

Next, the content additional information extraction unit 30b extracts additional information of content in step S115. The additional information of content is information added when the content is generated and may be a photographing date, photographing position information, lens information, exposure information, other sensor information and the like, for example.

Then, the detailed weather and place information search unit 30c acquires detailed weather information such as weather, temperature, humidity and wind power when photographing is performed on the basis of date and position information included in the additional information extracted by the content additional information extraction unit 30b in step S118.

In addition, the detailed weather and place information search unit 30c acquires detailed place information such as the name and attributes of a photographing place on the basis of the position information included in the additional information extracted by the content additional information extraction unit 30b in step S121.

Subsequently, the presence reproduction information generation unit 30f estimates the overall photographing situation on the basis of the feature values extracted by the content analysis unit 30a, the additional information extracted by the content additional information extraction unit 30b and the detailed weather and place information found by the detailed weather and place information search unit 30c in step S124. Specifically, location (determination of indoors/outdoors, place attribute or the like), situation (shopping, riding a boat on a river or the like), ambience of place (liveliness or the like), illumination and brightness and the like are estimated.

Next, the emotion value acquisition unit 30e acquires emotion values of subjects on the basis of a recognition result of the subject recognition unit 30d in step S127. Acquisition of the emotion values of the subjects will be described below with reference to FIG. 13.

In addition, the presence reproduction information generation unit 30f generates a data stream for each event as presence reproduction information in a format based on a presence reproduction information storage form in step S130.

Then, the presence reproduction information generation unit 30f embeds the generated presence reproduction information in the content or stores the presence reproduction information as a separate file in association with the content in step S133.

Figure 13:
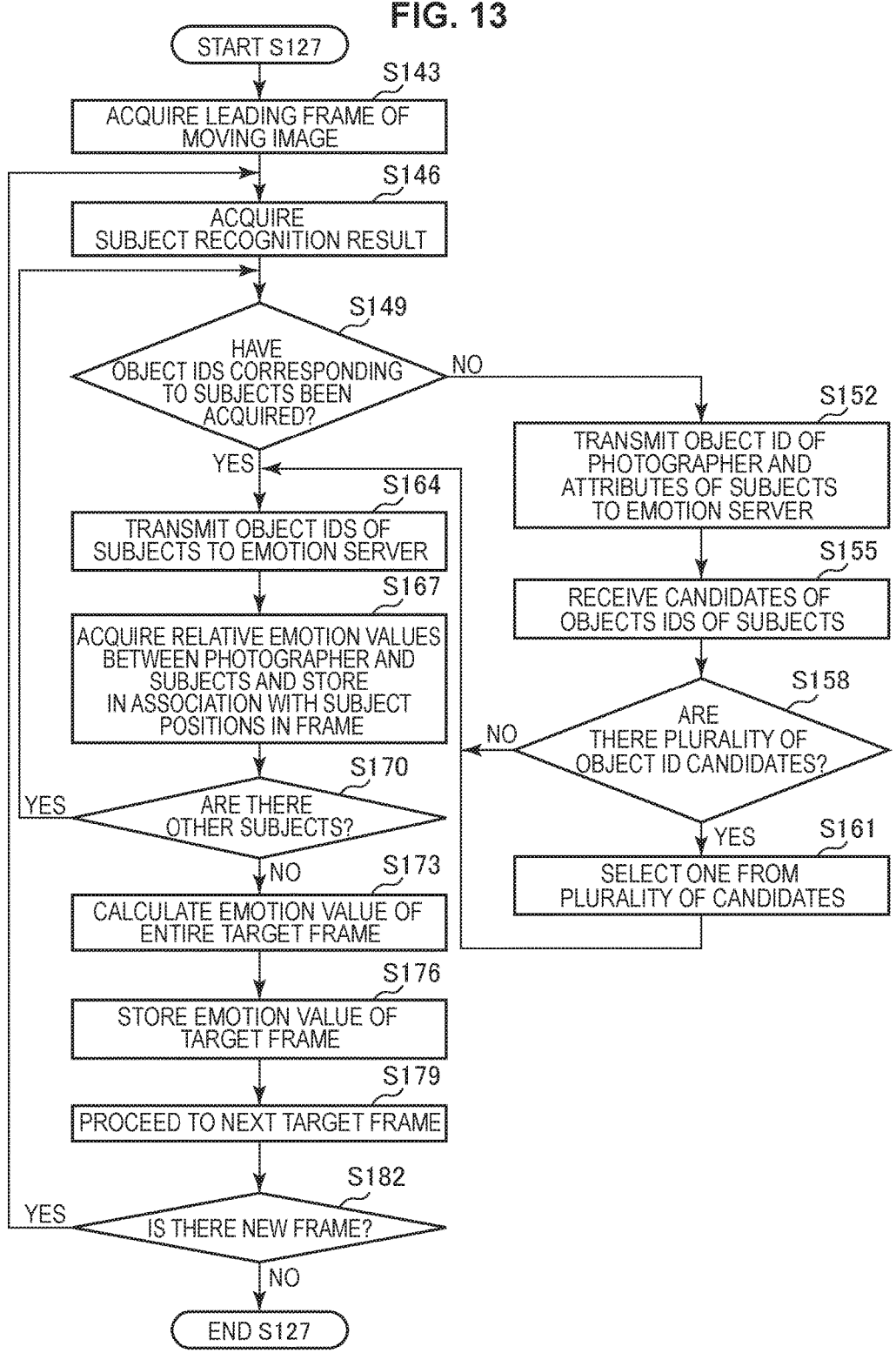
FIG. 13 is a flowchart illustrating an emotion value acquisition process according to the present embodiment.

Next, the emotion value acquisition process illustrated in S127 will be described with reference to FIG. 13. FIG. 13 is a flowchart illustrating an emotion value acquisition process according to the present embodiment. A case in which the content data is a moving image will be described with reference to FIG. 13.

First of all, the emotion value acquisition unit 30e acquires a leading frame of the moving image in step S143.

Figure 14:
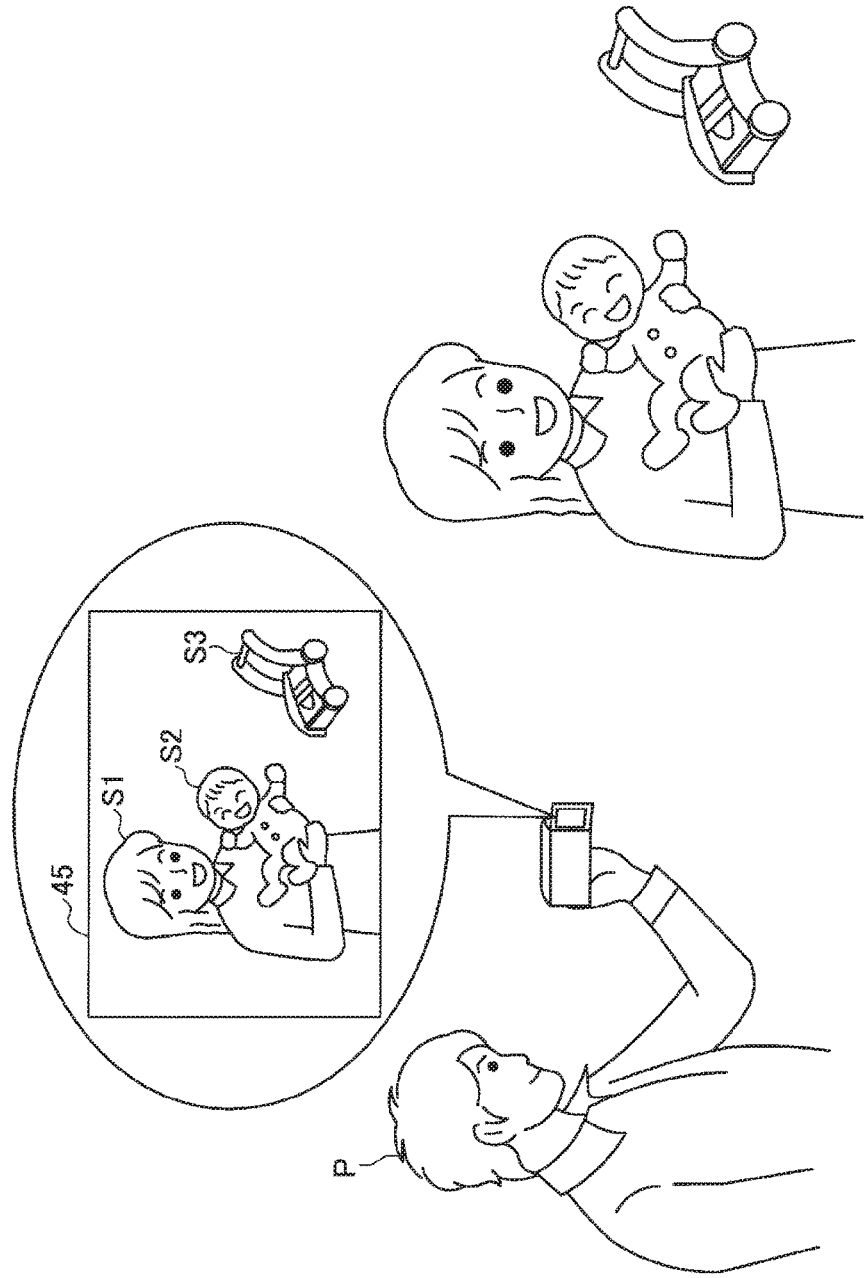
FIG. 14 is an explanatory diagram of subject recognition according to the present embodiment.

Then, the emotion value acquisition unit 30e acquires a subject recognition result of a target frame from the subject recognition unit 30d in step S146. The subject recognition unit 30d recognizes subjects in the frame on the basis of image feature value extracted through image analysis of the target frame. For example, subjects S1, S2 and S3 are recognized through image analysis of a frame 45 of a moving image generated through photography by a photographer P, as illustrated in FIG. 14.

Thereafter, the emotion value acquisition unit 30e acquires object IDs corresponding to the subjects of the target frame recognized by the subject recognition unit 30d in step S149. The object IDs of the subjects may be acquired from metadata embedded in the moving image or acquired from an object ID storage unit (not shown) included in the reproduction information generation device 3, for example.

If the object IDs of the subjects are not acquired (No in S149), the emotion value acquisition unit 30e transmits an object ID of the photographer and attributes of the subjects to the emotion server 2 in step S152. The attributes of the subjects are acquired from the subject recognition result and may be, for example, whether the subjects are persons or objects, their sexes, estimated ages, face characteristics, etc. when the subjects are persons, colors, sizes, types, etc. when the subjects are objects, and the like.

Subsequently, the emotion value acquisition unit 30e receives candidates of the object IDs of the subjects from the emotion server 2 in step S155. The emotion server 2 searches for objects having histories of interaction with the photographer for related objects identical or similar to the attributes of the subjects, for example, through the related object search unit 20d and transmits object IDs of the related objects to the reproduction information generation device 3 as candidates.

Then, if there are a plurality of object ID candidates transmitted from the emotion server 2 ("Yes" in S158), the emotion value acquisition unit 30e selects one object ID corresponding to the subjects from the plurality of candidates in step S161. The object ID may be selected by the user or may be automatically selected on the basis of interaction histories. If three object IDs of toy cars are transmitted, for example, an object ID of a toy car that has most frequently interacted with the photographer is selected from the three object IDs.

Subsequently, the emotion value acquisition unit 30e transmits the object IDs of the subjects to the emotion server 2 in step S164.

Thereafter, the emotion value acquisition unit 30e acquires relative emotion values between the photographer and the subjects and stores the acquired relative emotion values in association with the positions of the subjects in the frame in step S167. The relative emotion values between the photographer and the subjects may be calculated in the emotion server 2 or calculated by the emotion value acquisition unit 30e on the basis of evaluation of interactions between the photographer and the subjects received from the emotion server 2.

Subsequently, if there are other subjects in the target frame ("Yes" in S170), the process is repeated from step S149. Accordingly, relative emotion values indicating emotions or feelings of the photographer P (father, object ID: 312039) for the subject S1 (wife, object ID: 105384093), the subject S2 (child, object ID: 15122014) and the subject S3 (toy, object ID: 101960), illustrated in FIG. 14, are acquired, for example.

Here, calculation of the relative emotion values by the emotion value acquisition unit 30e will be described in detail with reference to FIGS. 15 and 16. FIG. 15 is an illustration of an example of data of interaction evaluation according to the present embodiment. Interaction evaluation shown in FIG. 15 is transmitted from the emotion server 2 on the basis of the object ID of the photographer and the object ID of each subject designated by the emotion value acquisition unit 30e.

For example, in the first line of the example of data shown in FIG. 15, evaluation of 0.7 is given to an interaction of "giving an accessory," performed by the photographer P (object ID: 312039) for the wife corresponding to the subject S1 (object ID: 105384093) on 24 Dec. 2013. In the second line, evaluation of 1.00 is given to an interaction of "being given the accessory" of the wife corresponding to the subject S1 (object ID: 105384093), performed by the photographer P (object ID: 312039) on 24 Dec. 2013. In this way, an interaction performed by an object on one side for an object on the other side may be detected by the objects of both sides.

Detected interaction types may be storing, physical affection, conversation, playing, etc., as illustrated in FIG. 15, in addition to the aforementioned giving.

A giving interaction is detected from, for example, a history of use of a credit card and a purchase history of Internet shopping, content written in mail and on social media, recognition of captured images obtained by cameras provided in a room or on an object, recognition of sounds obtained by microphones provided in a room or on an object, etc. Evaluation of the giving interaction is performed by the evaluation unit 20b of the emotion server 2. For example, the evaluation unit 20b extracts a spending degree on the basis of a usual purchase history of a person who gives a present and the ratio of an amount of money for the present to his or her income, a positive degree for the present based on recognition of conversation with a sales person, a sincerity degree based on a web page view time during Internet shopping and a time from page change to product selection, etc., assigns predetermined weights to such values and normalizes the values to a range of −1.0 to 1.0 to produce evaluation values.

In addition, a storing interaction is detected from an object position, movement history, recognition of captured images obtained through cameras provided in a room or on an object, and the like, for example. The evaluation unit 20b assigns weights to a storage place, humidity of the storage place, the amount of dust in the atmosphere and the like and normalizes the values to a range of −1.0 to 1.0 to produce evaluation values.

Furthermore, a physical affection interaction is detected on the basis of determination of touch through human body communication via wearable devices of both sides, image recognition through cameras, motion patterns of acceleration sensors of both sides, and the like, for example. The evaluation unit 20b assigns weights to various indices acquired from a degree of smiling obtained through smiling-face recognition, the sound of laughter obtained through voice recognition, and content of conversation and normalizes the result values to a range of −1.0 to 1.0 to produce evaluation values.

In addition, a conversation interaction is detected on the basis of voice recognition, voice tone, analysis of content written in mail and on social media (syntactic analysis and semantic analysis) and the like, for example. The evaluation unit 20b determines a degree of positive/negative mode of content of the conversation using words, context, voice tone, etc. included in the conversation and finally normalizes the result values to a range of −1.0 to 1.0 to produce evaluation values because a total sum of evaluations change depending on the number of words and the content of the conversation.

Furthermore, a playing interaction is detected on the basis of checking of connection between a near field communication chip attached to a toy and a near field communication chip attached to a child, motions of acceleration sensors of both sides and the like, for example. When "playing" cannot be recognized through connection checking and motions, if the toy is the object of the other side, the "playing" interaction is recognized because toys are for playing. The evaluation unit 20b obtains an evaluation value of the child for the toy on the basis of a result of measurement of interaction time of both sides and smiling-face detection and laughter detection through captured images and voice. In addition, an evaluation value from the viewpoint of the toy may be obtained by measuring how roughly the toy is handled and whether handling is beyond a prescribed mode of use of the toy. Although the evaluation value from the viewpoint of the toy decreases when an infant handles the toy roughly, it is possible to adjust the evaluation value at a step of finally obtaining the emotion value by decreasing a weight factor of the evaluation value from the viewpoint of the toy or correcting the evaluation value when the counterpart is an infant.

Subsequently, when relative emotion values indicating emotions and feelings of the photographer for the respective subjects are calculated through the emotion value acquisition unit 30e, the emotion value acquisition unit 30e extracts only interaction evaluation between the photographer and each subject from the interaction evaluation data shown in FIG. 15. FIG. 16 is an illustration of an example of data used for emotion value calculation extracted from the example of the interaction evaluation data shown in FIG. 15. As shown in FIG. 16, interaction evaluation between the photographer (object ID: 312039) and the subjects S1 to S3 (object IDs: 105384093, 15122014 and 101960) is extracted.

The emotion value acquisition unit 30e obtains the relative emotion values between the photographer and the subjects using total sums of evaluations of the target subjects, total sums obtained by multiplying interaction types of the target subjects by weight factors and then adding the evaluations of the target subjects thereto, or average values obtained by dividing the total sums by the numbers of interactions, for example.

Referring back to FIG. 13, the emotion value acquisition unit 30e calculates an emotion value of the entire frame in step S173. Specifically, the emotion value is acquired using a total sum of relative emotion values of subjects in the frame or an average obtained by dividing the total sum by the number of subjects, for example.

Then, the emotion value acquisition unit 30e stores the emotion values (the relative emotion values of the subjects and the emotion value of the entire frame) of the target frame in step S176.

Thereafter, the processing target frame proceeds to the next frame in step S179, and when there is a new frame ("Yes" in S182), the process is repeated from step S146.

Emotion value calculation according to the present embodiment has been described. Although a relative emotion value between each subject and the photographer is calculated in the embodiment described above, the present disclosure is not limited thereto and an absolute emotion value of each subject may be calculated or a relative emotion value between subjects may be calculated as necessary.

An absolute value of each subject is obtained using a total sum of all interaction evaluations of the subject, a total sum obtained by multiplying interaction types by weight factors and then adding all evaluations of the target subject thereto, or an average value obtained by dividing the total sum by the number of interactions.

Furthermore, a relative emotion value between subjects is obtained using a total sum of interaction evaluations between the subjects, a total sum obtained by multiplying interaction types by weight factors and then adding interaction evaluations between the subjects thereto, or an average value obtained by dividing the total sum by the number of interactions.

<3-2. Playback Process>

Figure 17:
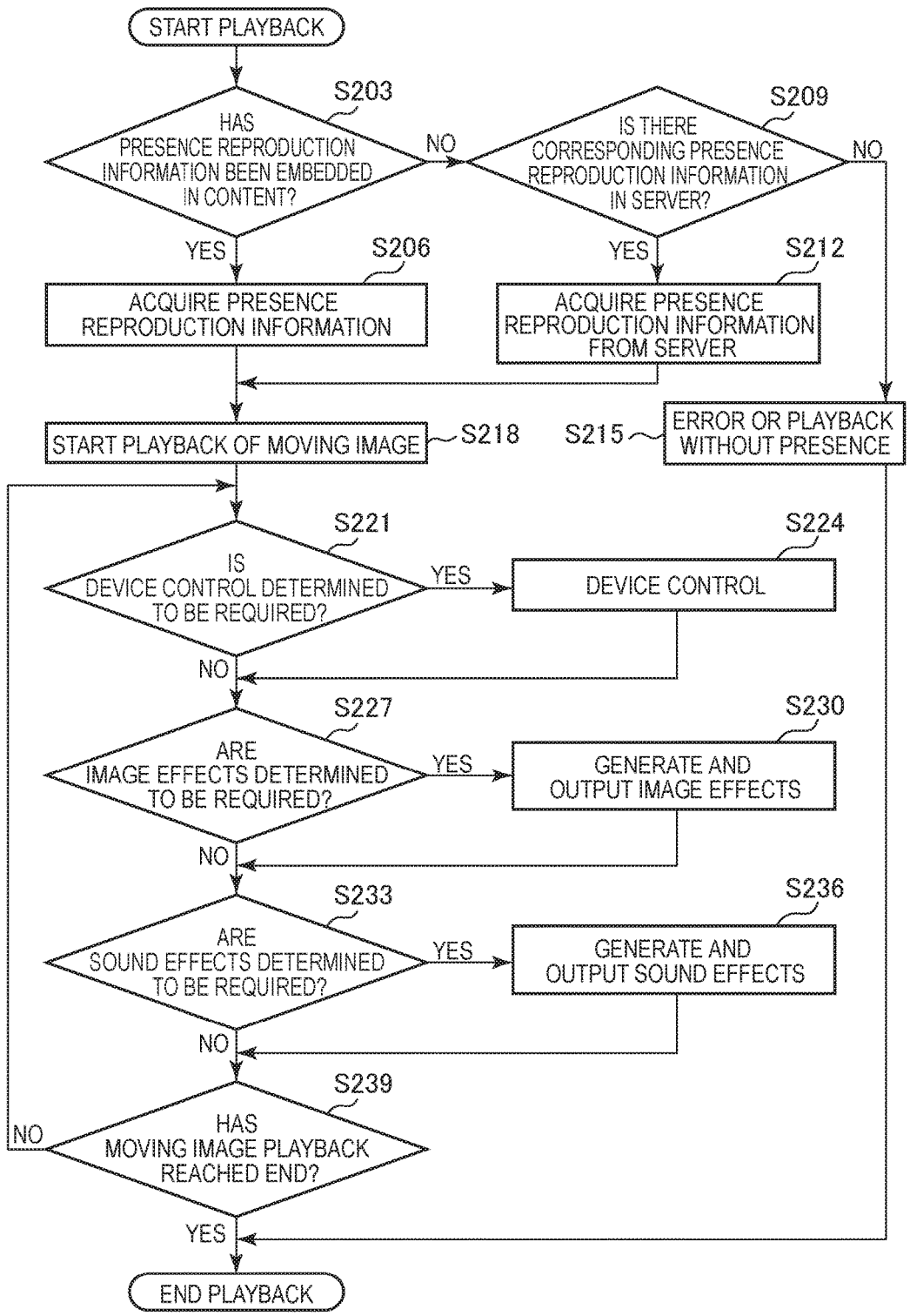
FIG. 17 is a flowchart illustrating a playback process according to the present embodiment.

Next, an operation process at the playback side according to the present embodiment will be described with reference to FIG. 17. FIG. 17 is a flowchart illustrating an operation process according to the present embodiment.

As illustrated in FIG. 17, first of all, the presence reproduction information acquisition unit 352 of the playback control device 35 determines whether presence reproduction information has been embedded in content data acquired by the content acquisition unit 351 in step S203.

Then, if the presence reproduction information has been embedded in the content data ("Yes" in S203), the presence reproduction information acquisition unit 352 acquires the presence reproduction information from the content data in step S206.

Conversely, if the presence reproduction information has not been embedded in the content data ("No" in S203), the presence reproduction information acquisition unit 352 determines whether the corresponding presence reproduction information has been stored as a separate file in a server (cloud) in step S209.

If the present reproduction information is present in the server ("Yes" in S209), the presence reproduction information acquisition unit 352 acquires the presence reproduction information from the server (cloud) in step S212.

Conversely, if the presence reproduction information is not present in the server ("No" in S209), the playback control device 35 performs error notification or controls playback of the content data without presence reproduction in step S215.

Subsequently, the content output controller 358 starts playback of a moving image (an example of content data) acquired by the content acquisition unit 351 and decoded by the decoder unit 357 in step S218. Specifically, the content output controller 358 controls the television device 36 (refer to FIG. 8) to play the moving image. In addition, the content output controller 358 performs a presence reproduction process described below during playback of the moving image.

Specifically, when the presence reproduction effect specifying unit 353 determines that device control for presence reproduction is needed on the basis of the presence reproduction information acquired by the presence reproduction information acquisition unit 352 ("Yes" in step S221), the device controller 356 performs device control in step S224. The presence reproduction effect specifying unit 353 decides a reproduction method for reproducing abstract presence described in the presence reproduction information depending on characteristics of each device. The device controller 356 controls the air-conditioner device 37a, the aroma spraying device 37b, the vibrating device 37c, the illumination device 37d, the blowing device 37e or the like to perform presence reproduction (vibration like that when riding a small boat, the wind felt on a small boat, warm and pleasant weather, outdoor brightness, reproduction of sunlight, the smell of a riverside and the like) in accordance with an instruction of the presence reproduction effect specifying unit 353.

Then, when the presence reproduction effect specifying unit 353 determines that image effects are required for presence reproduction on the basis of the presence reproduction information acquired by the presence reproduction information acquisition unit 352 ("Yes" in step S227), the image effect generation unit 354 generates image effects and the content output controller 358 outputs the generated image effects in step S230 (refer to FIGS. 10 and 11).

Thereafter, when the presence reproduction effect specifying unit 353 determines that sound effects are required for presence reproduction on the basis of the presence reproduction information acquired by the presence reproduction information acquisition unit 352 ("Yes" in step S233), the sound effect generation unit 355 generates sound effects and the content output controller 358 outputs the generated sound effects through a speaker of the television device 36 in step S236.

Then, the process of S221 through S223 is repeated until moving image playback reaches the end (S239). The aforementioned presence reproduction control is performed when frames associated with the presence reproduction information are played or at the moving image playback time associated with "Time" in the case of the format shown in FIG. 4.

Furthermore, presentation depending on emotion values described in the presence reproduction information may be performed in presence reproduction according to the present embodiment. The presence reproduction information includes relative emotion values indicating emotions or feelings of a photographer with respect to subjects, as described above. The present embodiment can provide a new experience of viewing subjects with the feeling of the photographer with respect to the subjects by performing presentation depending on the relative emotion values at the playback side. Hereinafter, a playback process depending on such emotion values will be described with reference to FIG. 18.

Figure 18:
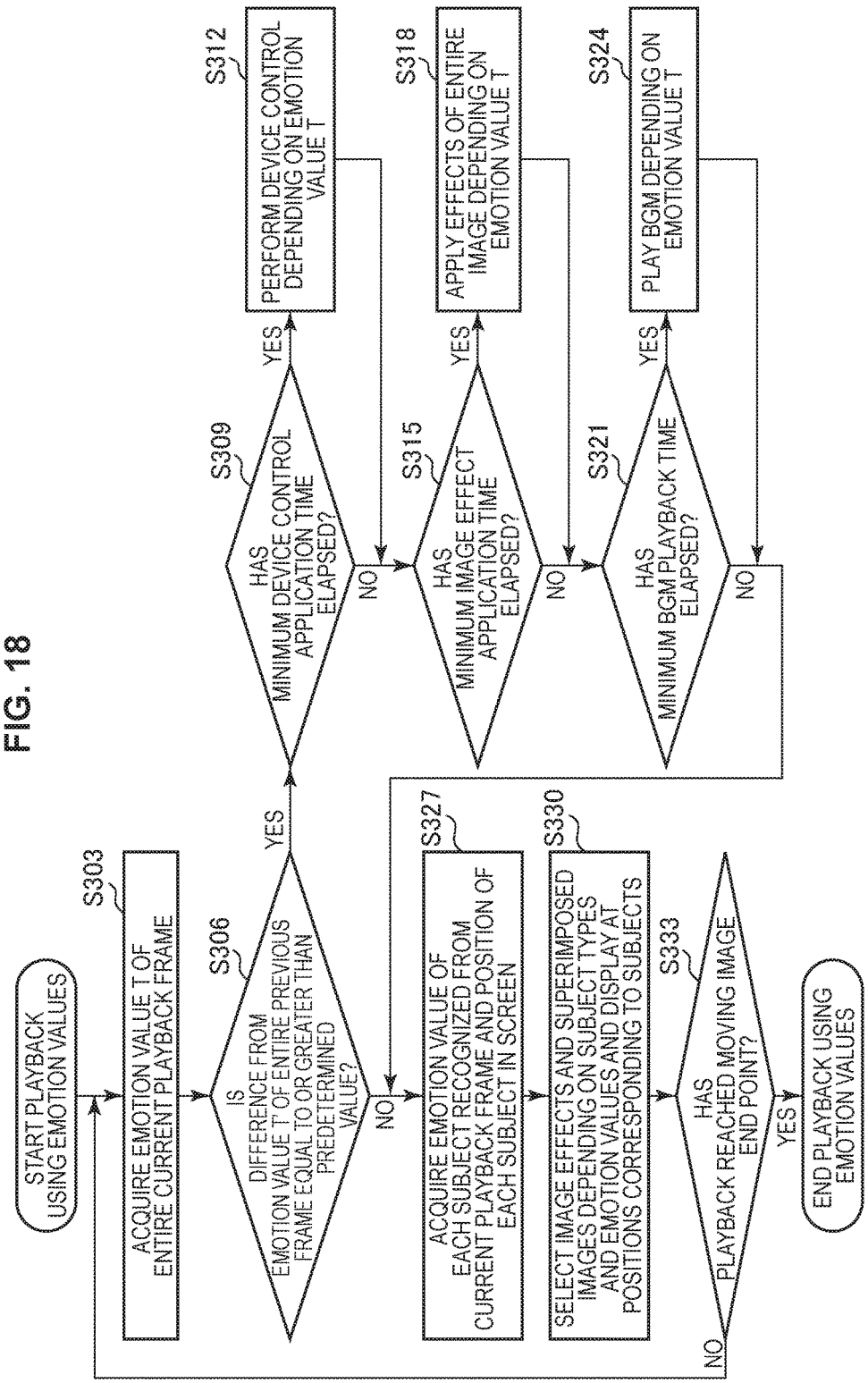
FIG. 18 is a flowchart illustrating a playback process using emotion values according to the present embodiment.

FIG. 18 is a flowchart illustrating a playback process using emotion values according to the present embodiment. As illustrated in FIG. 18, first of all, the presence reproduction effect specifying unit 353 acquires an emotion value T of the entire current playback frame in step S303. The emotion value T of the entire playback frame may be obtained from presence reproduction information acquired by the presence reproduction information acquisition unit 352. The emotion value T of the entire playback frame corresponds to an emotion value of the entire target frame described in step S173 of FIG. 13.

Then, the presence reproduction effect specifying unit 353 determines whether a difference between an emotion value T' of the entire previous frame and the emotion value T of the entire current frame is equal to or greater than a predetermined value in step S306.

Subsequently, when the emotion value difference is equal to or greater than the predetermined value ("Yes" in S306), the presence reproduction effect specifying unit 353 determines whether a minimum device control application time has elapsed in step S309. This is for the purpose of avoiding switching of device control within a short time.

If the minimum device control application time has elapsed ("Yes" in S309), the presence reproduction effect specifying unit 353 instructs the device controller 356 to perform device control depending on the emotion value T in step S312. For example, physical presentation depending on the emotion value, such as generation of vibration, discharge of smoke and change of illumination, is performed.

Then, the presence reproduction effect specifying unit 353 determines whether a minimum image effect application time has elapsed in step S315. This is for the purpose of avoiding switching of image effects within a short time.

If the minimum image effect application time has elapsed ("Yes" in S315), the presence reproduction effect specifying unit 353 instructs the image effect generation unit 354 to apply effects of the entire image depending on the emotion value T in step S318. Effects of the entire image are presentation of brightening the entire tone of the image or slightly reddening the hue of the image, for example.

Then, the presence reproduction effect specifying unit 353 determines whether a minimum background music (BGM) application time has elapsed in step S321. This is for the purpose of avoiding switching of BGM within a short time.

If the minimum BGM application time has elapsed ("Yes" in S321), the presence reproduction effect specifying unit 353 instructs the sound effect generation unit 355 to play BGM depending on the emotion value T. For example, merry and bright BGM is played when the emotion value T is high, whereas gloomy BGM is played when the emotion value T is low.

Then, the presence reproduction effect specifying unit 353 acquires an emotion value of each subject recognized from the current playback frame and the position of each subject in the screen (i.e., position in the frame) in step S327. The emotion value of each subject is a relative emotion value of the photographer with respect to each subject, which is included in the presence reproduction information.

Subsequently, the presence reproduction effect specifying unit 353 instructs the image effect generation unit 354 to select image effects and superimposed images depending on subject types and emotion values and instructs the content output controller 358 to display the selected image effects at positions corresponding to subjects in step S330. Here, an example of image effects arranged to correspond to subjects depending on emotion values will be described with reference to FIG. 19.

Depending on relative emotion values of subjects S1, S2 and S3 recognized from a frame 45 shown at the left side of FIG. 19, the presence reproduction effect specifying unit 353 arranges image effects E1 to E3 respectively corresponding to the subjects S1 to S3 as in a frame 46 shown at the right side of FIG. 19. If the subject S1 is a mother, the subject S2 is a child and the subject S3 is a toy, for example, image effects for family and children are selected. In addition, if relative emotion values are high, pleasant and bright image effects are selected. Furthermore, arrangement corresponding to a subject may be arrangement of an image effect around the subject such that the image effect and the subject do not overlap. Accordingly, a feeling of the photographer when performing photographing, an atmosphere during photography and the like are represented through newly added presentation, thereby reproducing presence during photography.

Although presentation (device control, image effects and BGM) depending on emotion values is described in S312, S318, S324 and S330, the present embodiment is not limited thereto, and when an abstract subjective expression of the photographer estimated from the relative emotion values of the subjects is described in the presence reproduction information, presentation depending on the subjective expression may be performed.

In addition, when moving image playback does not reach a moving image end point ("No" in step S333), the process of S303 through S330 is repeated.

The reproduction process according to the present embodiment has been described in detail.

4. Conclusion

As described above, in the presence reproduction system according to an embodiment of the present disclosure, it is possible to perform reproduction that matches characteristics of playback side devices by generating abstracted presence reproduction information.

Specifically, it is possible to extract information about senses in addition to vision and audio from a moving image through content analysis, generate abstracted presence reproduction information on the basis of the information and reproduce presence depending on characteristics of devices provided on the playback side on the basis of the abstracted presence reproduction information, thereby achieving picture playback providing various stimuli in addition to audio-visual stimuli. For example, it is possible to generate information (presence reproduction information) such as vibration, sensory temperature, wind and smell estimated as experience of a photographer and reproduce presence during photography using various devices provided in a room, a chair, an HMD and the like when the moving image is viewed on the basis of the generated information. Accordingly, a viewer can enjoy content more and perform deeper communication because the amount of information between a photographer and the viewer increases. Furthermore, it is possible to easily relive memories when looking at one's own pictures.

In addition, the presence reproduction information also includes an emotion value corresponding to an index indicating emotional relation of the photographer with a subject and presentation depending on the emotion value is performed during picture playback, and thus a feeling or emotion of the photographer for the subject can be reproduced and new presence can be provided to the viewer.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, a computer program for causing hardware such as a CPU, a ROM and a RAM included in the aforementioned emotion server 2, the reproduction information generation device 3 or the playback control device 35 to execute the functions of the emotion server 2, the reproduction information generation device 3 or the playback control device 35 may be created. In addition, a computer-readable storage medium having the computer program stored therein is provided.

Furthermore, although the reproduction information generation device 3 and the playback control device 35 are separate devices in the presence reproduction system 1 illustrated in FIG. 1, the present embodiment is not limited thereto and the reproduction information generation device 3 and the playback control device 35 may be integrated.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing system including:

a generation unit that generates abstracted presence reproduction information depending on features extracted from content data; and a storage controller that controls the presence reproduction information generated by the generation unit to be stored in association with the content data.

(2)

The information processing system according to (1), wherein the generation unit estimates a context when the content data is generated, depending on the features extracted from the content data, and generates presence reproduction information indicating the estimated context.

(3)

The information processing system according to (2), wherein the generation unit estimates a motion of a photographer when image data is photographed as the content data.

(4)

The information processing system according to (3), wherein the generation unit estimates a type of a vehicle or a transportation means that causes the motion of the photographer.

(5)

The information processing system according to (2), wherein the generation unit estimates an emotion value as the context and generates abstracted presence reproduction information indicating the emotion value.

(6)

The information processing system according to (5), wherein the generation unit estimates the emotion value depending on a user who generates the content data or an object included in the content data.

(7)

The information processing system according to (1), wherein the content data is associated with information indicating a date and time when the content data is generated and a place where the content data is generated, the generation unit generates an environment corresponding to the information indicating the date, time and place as the presence reproduction information, and the storage controller controls the presence reproduction information indicating the environment to be stored in association with the content data.

(8)

An information processing system including:

an acquisition unit that acquires presence reproduction information generated on the basis of content data;

an effect specifying unit that specifies effects for reproducing a context indicated by the presence reproduction information; and a playback controller that applies the specified effects to the content data and plays the content data.

(9)

The information processing system according to (8), wherein the acquisition unit acquires the presence reproduction information by extracting the presence reproduction information integrated with the content data from the content data or by receiving the presence reproduction information stored separately from the content data through a network.

(10)

The information processing system according to (8) or (9), wherein the playback controller includes a device controller that generates stimuli corresponding to the specified effects, and an output controller that outputs the content data.

(11)

The information processing system according to (8) or (9), wherein the playback controller includes a processing unit that performs processing corresponding to the specified effects, and an output controller that outputs content data on which the processing has been performed.

(12)

An information processing system including:

a generation unit that generates abstracted presence reproduction information depending on features extracted from content data;

an effect specifying unit that specifies effects for reproducing a context indicated by the presence reproduction information; and a playback controller that applies the specified effects to the content data and plays the content data.

(13)

A control method including:

generating abstracted presence reproduction information depending on features extracted from content data; and controlling the generated presence reproduction information to be stored in association with the content data.

(14)

A storage medium having a program stored therein, the program causing a computer to function as:

an acquisition unit that acquires presence reproduction information generated on the basis of content data;

an effect specifying unit that specifies effects for reproducing a context indicated by the presence reproduction information; and a playback controller that applies the specified effects to the content data and plays the content data.

REFERENCE SIGNS LIST 1 presence reproduction system
2 emotion server
20 controller
20a interaction storage controller
20b evaluation unit
20c object management unit
20d related object search unit
21 communication unit
22 object DB
24 emotion information DB
3 reproduction information generation device
30 controller
30a content analysis unit
30b content additional information extraction unit
30c detailed weather and place search unit
30d subject recognition unit
30e emotion value acquisition unit
30f presence reproduction information generation unit
30g storage controller
31 communication unit
32 content storage unit
33 presence reproduction information storage unit
35 playback control device
351 content acquisition unit
352 presence reproduction information acquisition unit
353 presence reproduction effect specifying unit
354 image effect generation unit
355 sound effect generation unit
356 device controller
357 decoder unit
358 content output controller

The invention claimed is:
1. An information processing system, comprising:
circuitry configured to:
acquire content data;

analyze the acquired content data to extract at least one feature from the acquired content data;
generate presence reproduction information based on the extracted at least one feature, wherein the generated presence reproduction information indicates a type of subject associated with the extracted at least one feature; and
control storage of the generated presence reproduction information in association with the acquired content data, wherein
a playback control device determines a reproduction manner for reproduction of an effect based on the presence reproduction information and based on characteristics of a reproducing device associated with the playback control device, and
the reproducing device reproduces the effect based on the reproduction manner.

2. The information processing system according to claim 1, wherein the circuitry is further configured to:
estimate a context based on generation of the content data and the extracted at least one feature; and
generate the presence reproduction information indicating the estimated context.

3. The information processing system according to claim 2, wherein the circuitry is further configured to estimate a photographer motion based on a capture of image data as the content data.

4. The information processing system according to claim 3, wherein
the circuitry is further configured to estimate at least one of a type of a vehicle or a transportation means, and
the photographer motion is based on at least one of the type of the vehicle or the transportation means.

5. The information processing system according to claim 2, wherein the circuitry is further configured to:
estimate an emotion value as the context; and
generate the presence reproduction information indicating the estimated emotion value.

6. The information processing system according to claim 5, wherein the circuitry is further configured to estimate the emotion value based on a user object identifier (ID).

7. The information processing system according to claim 1,
wherein the content data is associated with information indicating at least one of a date of generation of the content data, a time of the generation of the content data, or a place of the generation of the content data, and
the circuitry is further configured to:
generate an environment, as the presence reproduction information, corresponding to the information indicating at least one of the date of the generation of the content data, the time of the generation of the content data, or the place of the generation of the content data; and
control the storage of the generated presence reproduction information indicating the generated environment in association with the content data.

8. An information processing system, comprising:
circuitry configured to:
acquire, from a reproduction information generation device, presence reproduction information of content data,
wherein the reproduction information generation device:
acquires the content data,
analyzes the acquired content data to extract at least one feature from the acquired content data, and
generates the presence reproduction information based on the extracted at least one feature, wherein the generated presence reproduction information indicates a type of subject associated with the extracted at least one feature;
determine a reproduction manner for reproduction of an effect based on the presence reproduction information and based on characteristics of a reproducing device;
play back the content data; and
control the reproducing device to reproduce the effect, based on the reproduction manner and the playback of the content data.

9. The information processing system according to claim 8, wherein the circuitry is further configured to
acquire the presence reproduction information by one of:
extraction of the presence reproduction information from the content data, or
reception of the presence reproduction information stored separately from the content data, through a network.

10. The information processing system according to claim 8, wherein the circuitry is further configured to:
generate stimuli corresponding to the effect; and
output the content data based on the generated stimuli.

11. The information processing system according to claim 8, wherein the circuitry is further configured to:
execute a processing operation corresponding to the effect; and
output the content data on which the processing operation has been executed.

12. An information processing system, comprising:
circuitry configured to:
acquire content data;
analyze the acquired content data to extract at least one feature from the acquired content data;
generate presence reproduction information based on the extracted at least one feature, wherein the presence reproduction information indicates a type of subject associated with the extracted at least one feature;
determine a reproduction manner for reproduction of an effect based on the generated presence reproduction information and characteristics of a reproducing device;
play back the content data; and
control the reproducing device to reproduce the effect, based on the reproduction manner and the playback of the content data.

13. A control method, comprising:
acquiring, by circuitry, content data;
analyzing, by the circuitry, the acquired content data to extract at least one feature from the acquired content data;
generating, by the circuitry, presence reproduction information based on the extracted at least one feature, wherein the presence reproduction information indicates a type of subject associated with the extracted at least one feature; and
controlling, by the circuitry, storage of the generated presence reproduction information in association with the acquired content data, wherein
a playback control device determines a reproduction manner for reproduction of an effect based on the presence reproduction information and based on characteristics of a reproducing device associated with the playback control device, and the reproducing device reproduces the effect based on the reproduction manner.

14. A non-transitory computer-readable medium having stored thereon computer-executable instructions that, when executed by a processor, cause the processor to execute operations, the operations comprising:

acquiring, from a reproduction information generation device, presence reproduction information of content data, wherein the reproduction information generation device:

acquires the content data, analyzes the acquired content data to extract at least one feature from the acquired content data, and generates the presence reproduction information based on the extracted at least one feature, wherein the generated presence reproduction information indicates a type of subject associated with the extracted at least one feature;

determining a reproduction manner for reproduction of an effect based on the presence reproduction information and based on characteristics of a reproducing device;

playing back the content data; and controlling the reproducing device to reproduce the effect, based on the reproduction manner and the playback of the content data.

* * * * *